US012106553B2

(12) United States Patent
Patel et al.

(10) Patent No.: US 12,106,553 B2
(45) Date of Patent: Oct. 1, 2024

(54) METHOD AND SYSTEM FOR AERIAL OBJECT DETECTION

(71) Applicant: The Boeing Company, Chicago, IL (US)

(72) Inventors: Vandan Patel, Lilburn, GA (US); Nick Shadbeh Evans, Lynnwood, WA (US); Eric Raymond Muir, Bothell, WA (US)

(73) Assignee: The Boeing Company, Chicago, IL (US)

( * ) Notice: Subject to any disclaimer, the term of this patent is extended or adjusted under 35 U.S.C. 154(b) by 342 days.

(21) Appl. No.: 17/539,849

(22) Filed: Dec. 1, 2021

(65) Prior Publication Data

US 2022/0198788 A1 Jun. 23, 2022

Related U.S. Application Data

(60) Provisional application No. 63/127,160, filed on Dec. 18, 2020.

(51) Int. Cl.
*G06V 10/82* (2022.01)
*G06T 7/215* (2017.01)
(Continued)

(52) U.S. Cl.
CPC ............. *G06V 10/82* (2022.01); *G06T 7/215* (2017.01); *G06V 10/25* (2022.01); *G06V 10/26* (2022.01);
(Continued)

(58) Field of Classification Search
CPC ........ G06V 10/82; G06V 10/25; G06V 10/26; G06V 10/44; G06V 10/764;
(Continued)

(56) References Cited

U.S. PATENT DOCUMENTS

| 11,698,625 | B2* | 7/2023 | Berntorp | G05B 19/4155 |
| | | | | 700/49 |
| 2002/0054211 | A1* | 5/2002 | Edelson | H04N 7/183 |
| | | | | 348/169 |

(Continued)

OTHER PUBLICATIONS

Todorovic et al. A vision system for intelligent mission profiles of micro air vehicles, 2004.*

*Primary Examiner* — John B Strege
(74) *Attorney, Agent, or Firm* — Jordan IP Law, LLC

(57) ABSTRACT

A computer-implemented method is provided for detecting a dynamic object in a visual line of sight of an aircraft. The method includes implementing, by a computer system, the following operations: receiving at least two image frames; detecting a horizon within at least one of the at least two image frames; segmenting each of the at least two image frames into at least first and second search regions using the detected horizon, wherein the first search region is defined above the detected horizon in the at least two image frames and the second search region is defined below the horizon in the at least two image frames; determining, across the at least two image frames, a motion vector field within at least one of the first search region or the second search region; and identifying a detection proposal using the determined motion vector field.

53 Claims, 20 Drawing Sheets

(51) Int. Cl.
  *G06V 10/25* (2022.01)
  *G06V 10/26* (2022.01)
  *G06V 10/44* (2022.01)
  *G06V 10/764* (2022.01)
  *G06V 10/77* (2022.01)
  *G06V 20/58* (2022.01)

(52) U.S. Cl.
  CPC ............ *G06V 10/44* (2022.01); *G06V 10/764* (2022.01); *G06V 10/7715* (2022.01); *G06V 20/58* (2022.01)

(58) Field of Classification Search
  CPC .... G06V 10/7715; G06V 10/36; G06V 20/58; G06T 7/215; G06T 7/11; G06T 7/246; G06T 2207/10016
  See application file for complete search history.

(56) References Cited

U.S. PATENT DOCUMENTS

| | | | |
|---|---|---|---|
| 2020/0065981 A1* | 2/2020 | Akashi | G06T 7/194 |
| 2020/0226763 A1* | 7/2020 | Wei | G06T 7/20 |
| 2021/0065377 A1* | 3/2021 | Das | G06T 7/60 |
| 2022/0012889 A1* | 1/2022 | Jafek | G06T 7/11 |

\* cited by examiner

METHOD AND SYSTEM FOR AERIAL OBJECT DETECTION

CROSS-REFERENCE TO RELATED APPLICATION

This application claims the benefit of and priority to U.S. Provisional Application No. 63/127,160, entitled "Method and System for Aerial Object Detection", filed Dec. 18, 2020, which is incorporated by reference herein in its entirety.

BACKGROUND

During operation of an aircraft, detecting other dynamic objects (e.g., other aircraft, ground vehicles, etc.) located within the visual line of sight of the aircraft may be important, for example to avoid collision with such other dynamic objects. Object detection may be especially important for autonomous aircraft. Traditionally, other dynamic objects are detected using radar, but object detection using radar is costly. Moreover, the use of computer vision for object detection has been limited by the relatively small digital appearance (e.g., as small as ten pixels, etc.) of dynamic objects within the images analyzed by the computer. Neural networks are also known for image recognition but are currently only capable of handling input images of a limited size (e.g., cannot feasible handle 4K images, etc.). Input images having sizes that exceed the capabilities of the neural network are therefore scaled down resulting in a loss of quality that may inhibit the ability of the neural network to detect the dynamic objects within the images.

SUMMARY

In one aspect, a computer-implemented method is provided for detecting a dynamic object in a visual line of sight of an aircraft. The method includes implementing, by a computer system, the following operations: receiving at least two image frames; detecting a horizon within at least one of the at least two image frames; segmenting each of the at least two image frames into at least first and second search regions using the detected horizon, wherein the first search region is defined above the detected horizon in the at least two image frames and the second search region is defined below the horizon in the at least two image frames; determining, across the at least two image frames, a motion vector field within at least one of the first search region or the second search region; and identifying a detection proposal using the determined at least one motion vector field.

In another aspect, a system is provided for detecting a dynamic object in a visual line of sight of an aircraft. The system includes one or more processors and a memory storing instructions that, when executed by the one or more processors, cause the one or more processors to perform operations including: receiving at least two image frames; detecting a horizon within at least one of the at least two image frames; segmenting each of the at least two image frames into at least first and second search regions using the detected horizon, wherein the first search region is defined above the detected horizon in the at least two image frames and the second search region is defined below the horizon in the at least two image frames; determining, across the at least two image frames, a motion vector field within at least one of the first search region or the second search region; and identifying a detection proposal using the determined motion vector field.

In another aspect, a computer program product is provided, including a computer usable medium having a computer readable program code embodied therein. The computer readable program code is adapted to be executed to implement a method for detecting a dynamic object in a visual line of sight of an aircraft. The method includes: receiving at least two image frames; detecting a horizon within at least one of the at least two image frames; segmenting each of the at least two image frames into at least first and second search regions using the detected horizon, wherein the first search region is defined above the detected horizon in the at least two image frames and the second search region is defined below the horizon in the at least two image frames; determining, across the at least two image frames, a motion vector field within at least one of the first search region or the second search region; and identifying a detection proposal using the determined motion vector field.

DETAILED DESCRIPTION

Figure 1:
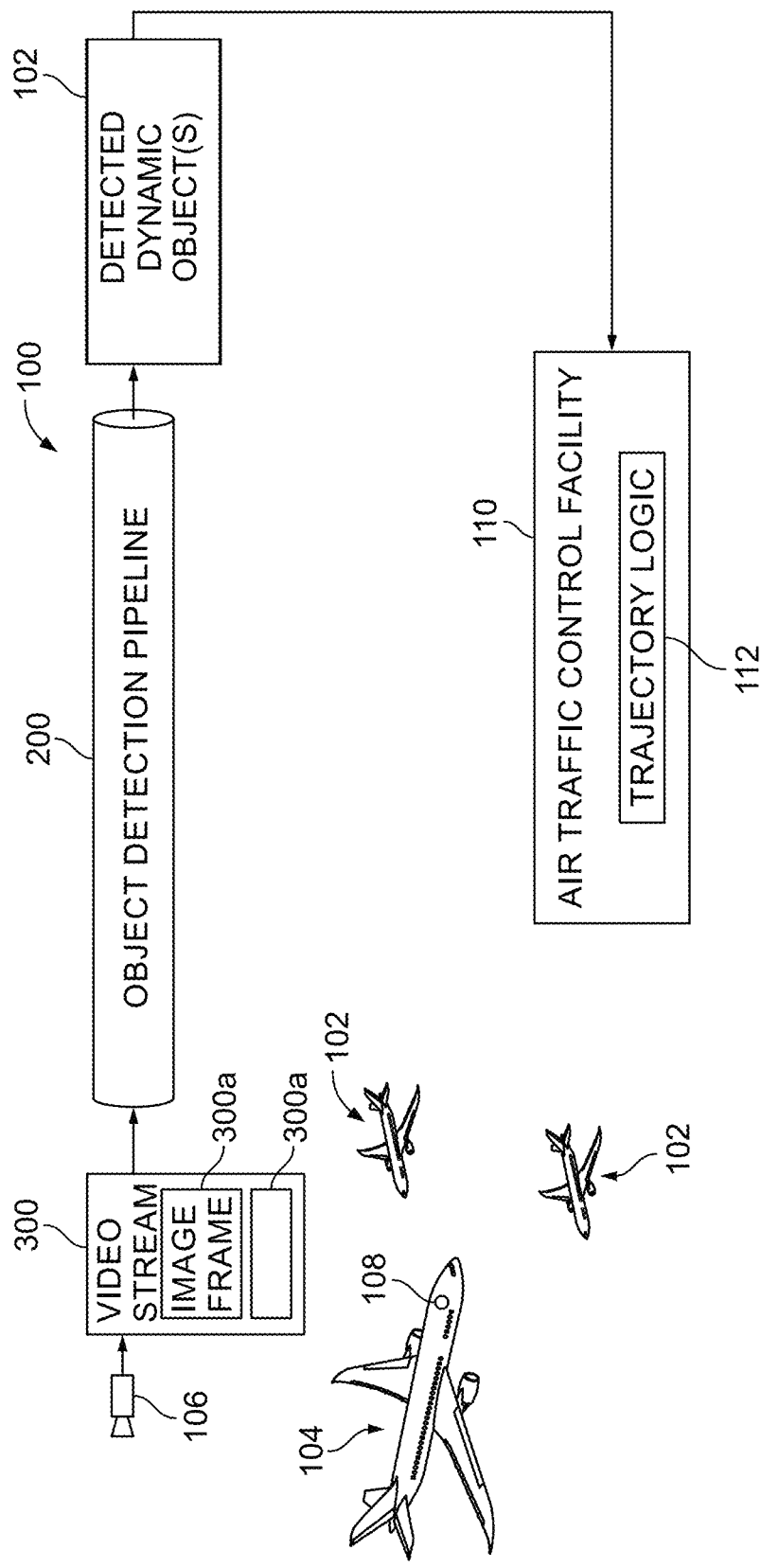
FIG. 1 is a block diagram of an air traffic detection architecture that can be used to detect dynamic objects in a visual line of sight of an aircraft, in accordance with an implementation.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to "one implementation" are not intended to be interpreted as excluding the existence of additional implementations that also incorporate the recited features. Moreover, unless explicitly stated to the contrary, implementations "comprising" or "having" an element or a plurality of elements having a particular property can include additional elements not having that property.

While various spatial and directional terms, such as "above," "below," and the like are used to describe implementations of the present disclosure, it is understood that such terms are merely used with respect to the orientations shown in the drawings. The orientations can be inverted, rotated, or otherwise changed, such that above becomes below if the aircraft is flipped 180 degrees, becomes alongside if the aircraft is rolled 90°, and the like.

Implementations of the disclosure include methods and systems for detecting a dynamic object in the visual line of sight of an aircraft. These implementations provide for detecting a horizon within at least one of at least two image frames; segmenting each of the at least two image frames into at least first and second search regions using the detected horizon, wherein the first search region is defined above the detected horizon in the at least two image frames and the second search region is defined below the horizon in the at least two image frames; determining, across the at least two image frames, a motion vector field within at least one of the first search region or the second search region; and identifying a detection proposal using the determined motion vector field.

Implementations of the present disclosure provide methods and system that operate in an unconventional manner to detect dynamic objects in the visual line of sight of an aircraft. Implementations of the present disclosure have a technical effect of improved operation of a computer, for example providing a more efficient and directed search for dynamic objects, providing a more-accurate computer vision system, and improving the efficiency of computational hardware (e.g., as compared to traditional computer vision systems and traditional systems that utilize convolutional neural networks (CNNs), etc.). The implementations disclosed herein improve the operation of a computer by reducing processing time and thereby, detection time. The implementations disclosed herein improve overall autonomous system reliability for object detection. In some implementations, only a single camera (monocular vision) is used for the input image frames. The use of a single camera can reduce component failures and be more easily integrated into existing systems.

Implementations of the present disclosure are able to detect the horizon within an image frame and segment the image frame into two or more search regions, for example a search region above the horizon and a search region below the horizon. Segmentation of image frames into two or more search regions enables the implementations disclosed herein to improve the accuracy of a computer vision system and provide a more efficient and directed search, for example using different dedicated parameters sets tailored for each search region. Accordingly, the implementations disclosed herein disclose an improved computer vision system for dynamic object detection that provides a dissimilar solution to known computer vision systems, for example as compared to known end-to-end machine learning vision. For example, the implementations disclosed herein provide a (e.g., relatively highly) deterministic and explainable computer vision solution that is easier to certify (e.g., as compared to known machine learning approaches, etc.).

Moreover, some implementations of the present disclosure provide a hybrid image detection technique that includes both computer vision and one or more neural networks, which allows for leveraging the full image search and relatively fast processing time of computer vision with the reliability and robustness of object detection using neural networks. In some implementations, the computer vision disclosed herein identifies detection proposals (e.g., regions of interest within the image frames that may contain a dynamic object, etc.) for further processing by a neural network. The reduced-size detection proposals provide a more manageable size for the neural network to process, thereby enabling faster object detection performance (e.g., 1-10 hertz, etc.) and therefore a more efficient search, for example as compared to the performance (e.g., 0.1 hertz, etc.) of known techniques wherein neural networks process full-size image frames.

Referring more particularly to the drawings, FIG. 1 illustrates an air traffic detection architecture 100. The air traffic detection architecture 100 includes an object detection pipeline 200, which is shown and described in further detail with respect to FIG. 3. The object detection pipeline 200 performs detection of dynamic objects 102 in a visual line of sight of an aircraft 104. Each of the dynamic object 102 and the aircraft 104 may be an example of a flying apparatus 902, described in further retail in relation to FIG. 12. A camera 106 (e.g., onboard the aircraft 104, etc.) provides a video stream 300 for use by the object detection pipeline 200. The components of the architecture 100 are identified in FIG. 1, with example data and further detail shown in FIGS. 2-9, and the operation of architecture 100 is described in further detail in relation to FIGS. 2-9. The architecture 100 receives a video stream 300 comprising a plurality of image frames 300*a*. An example image frame 300*a* is shown in a clean form in FIG. 2A and in an annotated form in FIG. 2B. The processing of at least two image frames 300*a* (e.g., two or more consecutive image frames 300*a*, etc.) will be described.

As will be described in more detail below, the object detection pipeline 200 processes two or more image frames 300*a* (e.g., consecutive image frames 300*a*, etc.) and outputs an identification of one or more dynamic objects 102 detected in the visual line of sight of the aircraft 104. For example, in some implementations the object detection pipeline 200 is used to detect dynamic objects 102 that are non-compliant with automatic dependent surveillance broadcasting (ADSB), for example. In addition or alternatively, the object detection pipeline 200 is used to detect dynamic objects 102 that are ADSB compliant, for example to provide a redundancy that verifies the presence of an ADSB compliant dynamic object 102.

In some implementations, dynamic objects 102 detected by the object detection pipeline 200 are used onboard the aircraft 104, for example to attempt to avoid collisions, for tracking and/or management of nearby dynamic objects 102 (e.g., other aircraft, ground vehicles, etc.), and/or the like. For example, dynamic objects 102 detected by the object detection pipeline 200 may be provided to trajectory logic 108 located onboard the aircraft 104 (e.g., as a component of a control system of the aircraft 104, etc.) that, for example, plots a safe trajectory of the aircraft 104 around the detected dynamic object 102 to attempt to avoid collision with the detected dynamic object 102.

In some implementations, dynamic objects 102 detected by the object detection pipeline 200 are used on the ground, for example by an air traffic control facility 110. For example, the air traffic control facility 110 may leverage dynamic objects 102 detected by the object detection pipeline 200 to manage airspace, manage incoming and outgoing traffic on the ground, etc. Moreover, and for example, trajectory logic 112 located on the ground (e.g., as a component of the air traffic control facility 110, etc.) may use the dynamic objects 102 detected by the object detection pipeline 200 to, for example, plot a safe trajectory of the aircraft 104 around the detected dynamic object 102.

The operations performed by the object detection pipeline 200 may be performed onboard the aircraft 104 (e.g., using one or more computing systems located onboard the aircraft 104, etc.) and/or on the ground (e.g., using one or more computing systems of the air traffic control facility 110, etc.). For example, in some implementations the operations performed by the object detection pipeline 200 are performed entirely onboard the aircraft 104, while in other implementations the operations performed by the object detection pipeline 200 are performed entirely on the ground. Moreover, and for example, in some implementations some of the operations performed by the object detection pipeline 200 are performed onboard the aircraft 104 while other operations performed by the object detection pipeline 200 are performed on the ground.

In the implementations shown and described herein, the object detection pipeline 200 performs the detection of the dynamic objects 102 using images frames 300a received from only a single (i.e., one) camera 106. In other words, the object detection pipeline 200 performs the detection of the dynamic objects 102 using monocular vision. In some other implementations, the object detection pipeline 200 performs the detection of dynamic objects 102 using image frames 300a received from two or more cameras 106.

Figure 2A:
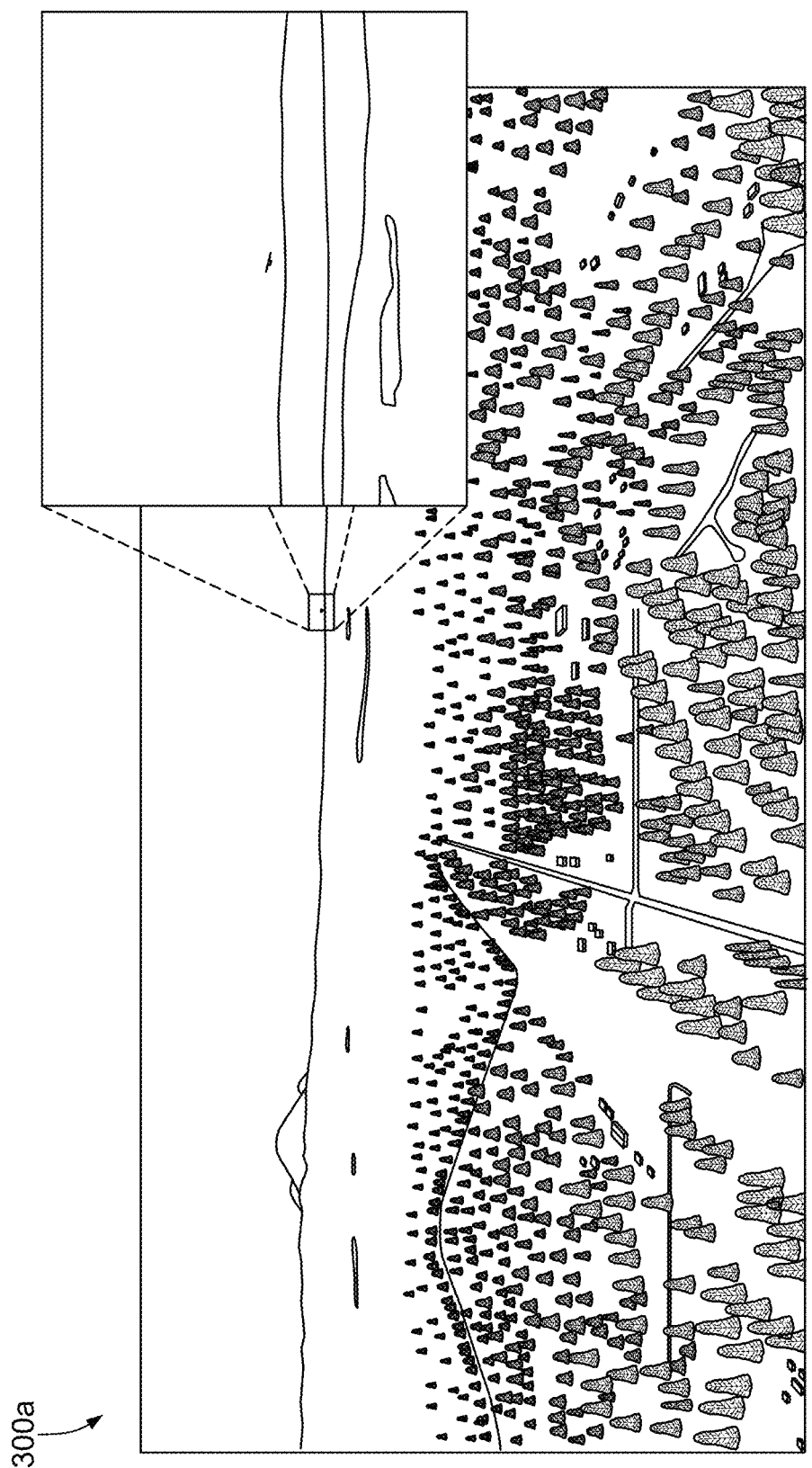
FIG. 2A illustrates a representative example of an image frame, in accordance with an implementation.
Figure 2B:
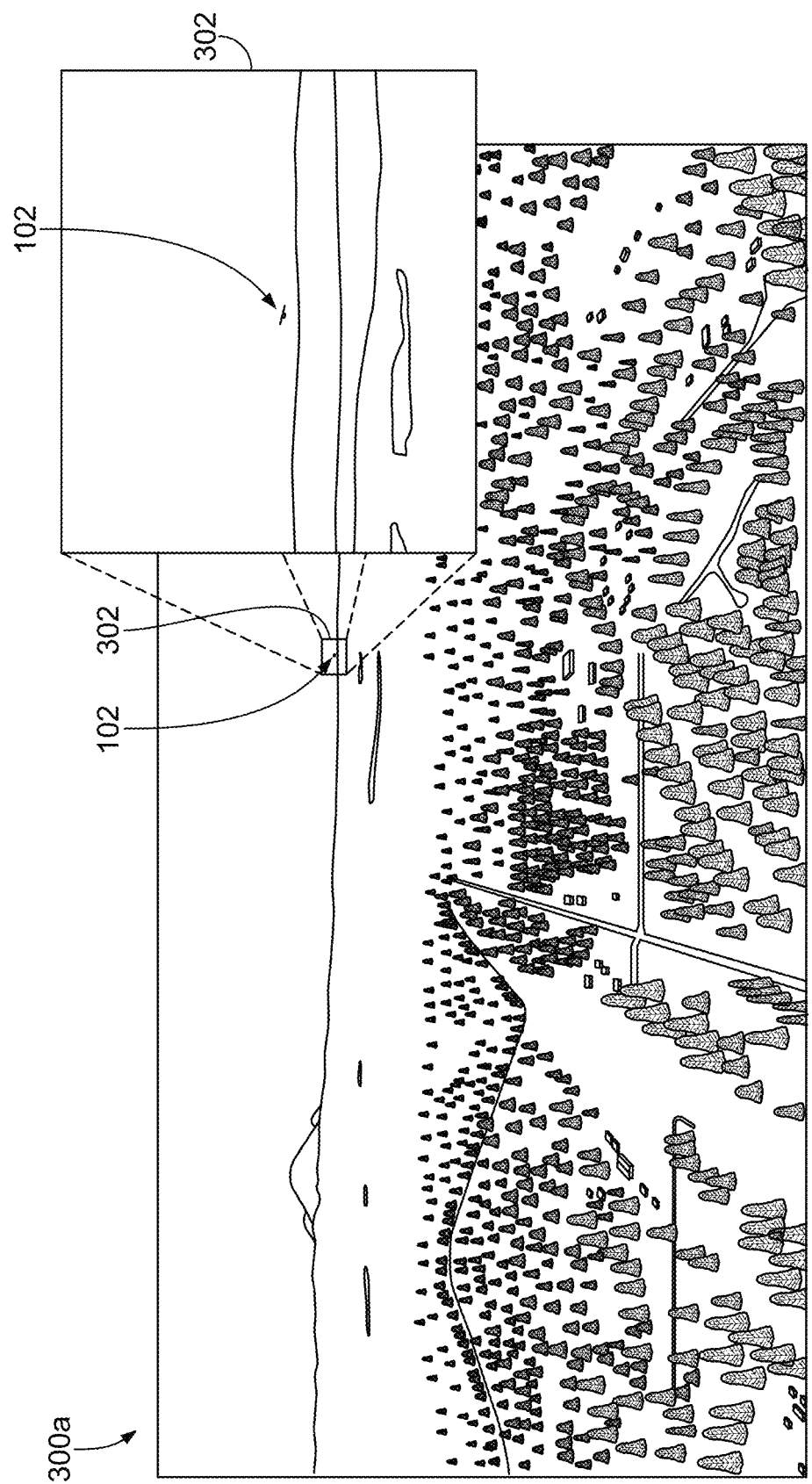
FIG. 2B illustrates an annotated version of the image frame shown in FIG. 2A.

FIG. 2A illustrates the representative image frame 300a used by the object detection pipeline 200 to detect dynamic objects 102. For clarity, FIG. 2A illustrates a clean version of the image frame 300a, while FIG. 2B illustrates an annotated version of the image frame 300a. A region of interest 302 within the image frame 300a that includes a dynamic object 102 has been enlarged in FIGS. 2A and 2B to illustrate the dynamic object 102. The enlarged region of interest 302 illustrates the relatively small appearance (e.g., as small as ten pixels, etc.) of the dynamic object 102 within the unenlarged image frame 300a.

Figure 3:
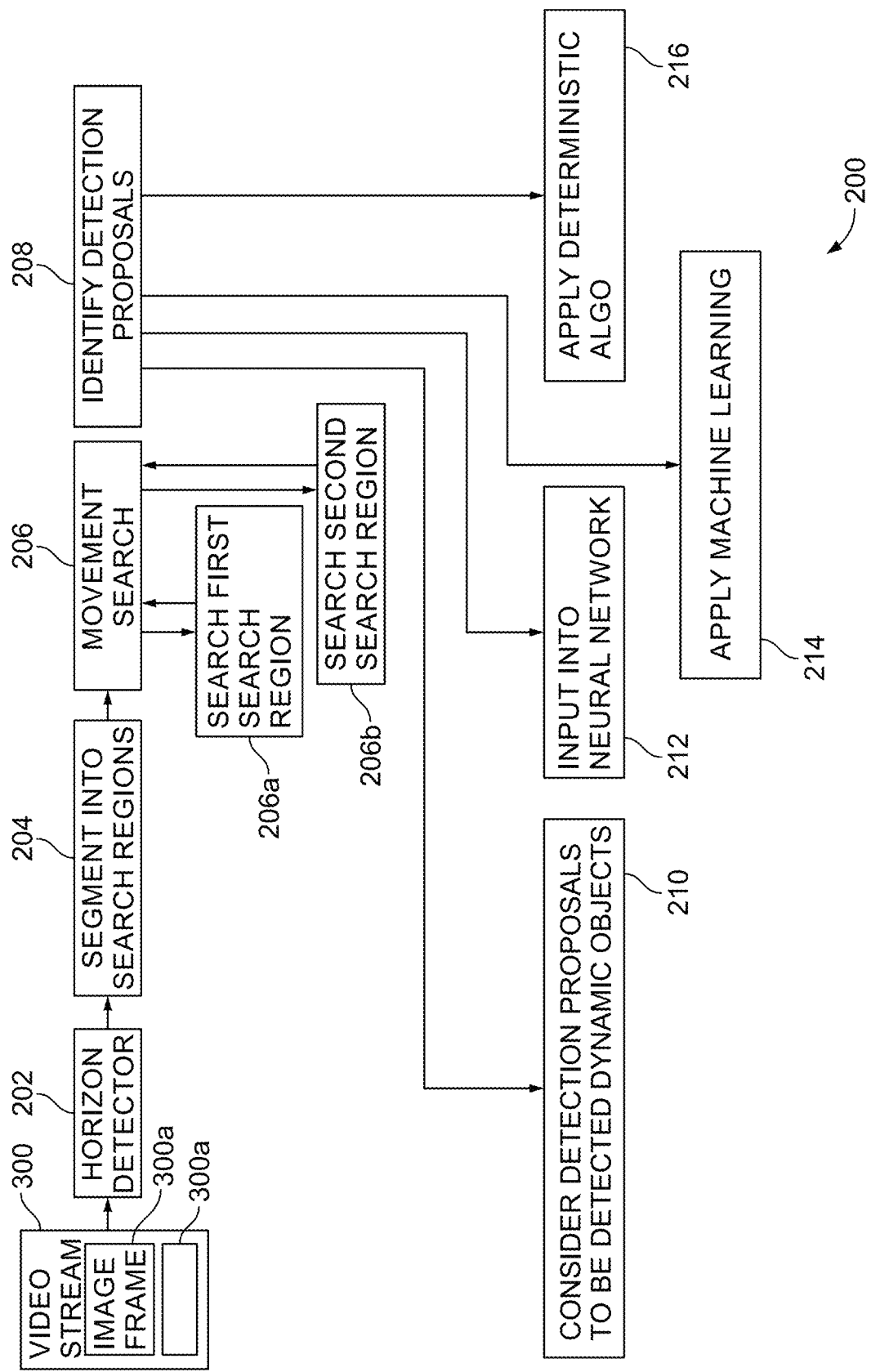
FIG. 3 is a block diagram of an object detection pipeline of the air traffic detection architecture shown in FIG. 1, in accordance with an implementation.
Figure 4:
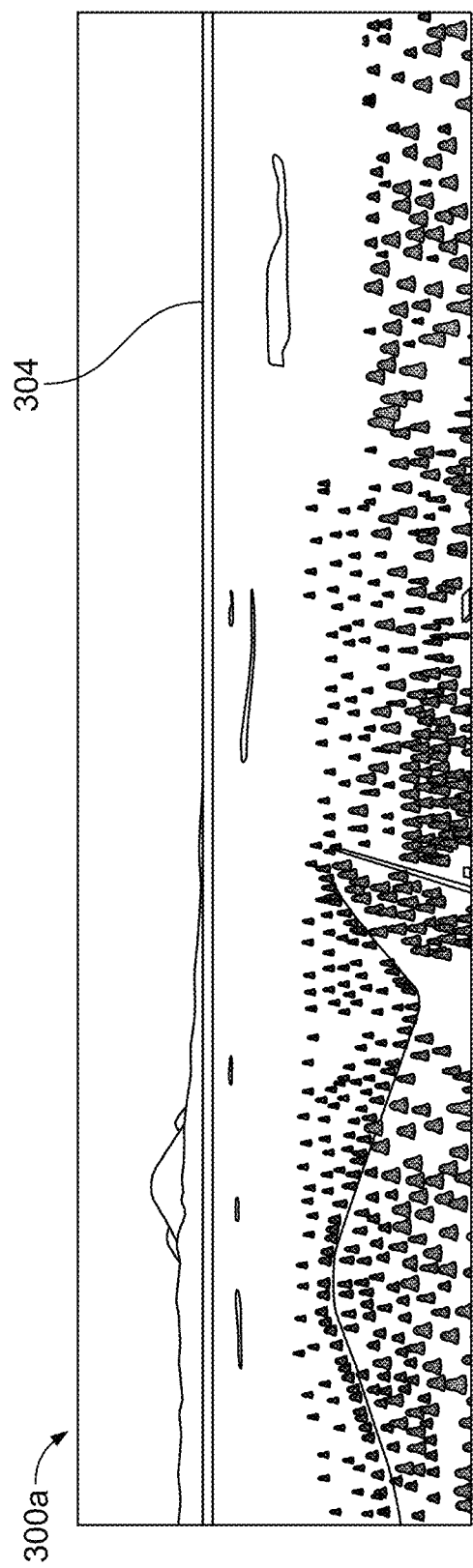
FIG. 4 illustrates a representative example of an image frame wherein a horizon has been detected therein, in accordance with an implementation.

FIG. 3 illustrates a block diagram of the object detection pipeline 200, which comprises a portion of the architecture 100. The object detection pipeline 200 receives at least two image frames 300a (e.g., two or more consecutive image frames 300a, etc.). The received image frames 300a are provided to a horizon detector 202 that detects the horizon within at least one of the image frames 300a. The horizon detector 202 outputs image frames 300a that include an identification (e.g., a line, etc.) of the detected horizon. For example, FIG. 4 illustrates an example of an image frame 300a wherein the horizon, identified by the line 304, has been detected by the horizon detector 202. One example of a technique used by the horizon detector 202 to detect the horizon within the image frames 300a is the horizon detection pipeline 400 described below with reference to FIG. 5. Other examples of techniques used to detect the horizon within the image frames 300a include detecting the horizon within the image frames 300a at least partially: using machine learning (e.g., a machine learned convolutional neural network performing binary pixelwise semantic segmentation and a heuristic, etc.); using a custom convolutional neural network that regresses parameters for an equation that best fits a line; by converting the image frame 300a to grayscale, applying computer vision heuristic for image thresholding, and doing a line regression; detecting the horizon within the image frame 300a using data received from an inertial measurement unit (IMU) of the aircraft 104; and/or the like. In some implementations, two or more different techniques are used in combination to detect the horizon within the image frames 300a.

Figure 5:
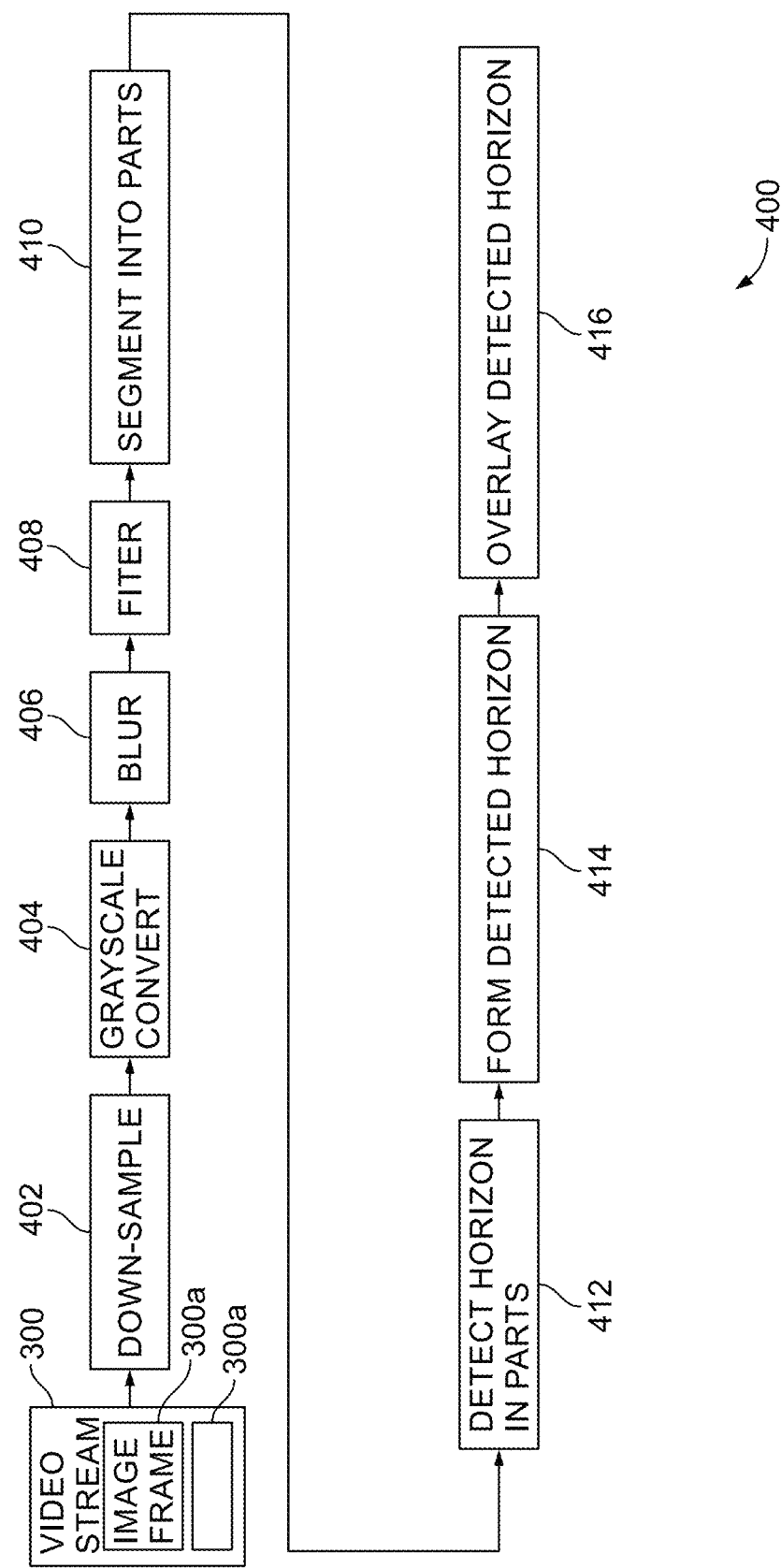
FIG. 5 is a block diagram of a horizon detection pipeline of the object detection pipeline shown in FIG. 3, in accordance with an implementation.
Figure 6A:
FIG. 6A illustrates a representative example of a downsampled image frame, in accordance with an implementation.

FIG. 5 illustrates the horizon detection pipeline 400 according to an implementation. In some implementations, the horizon detector 202 of the object detection pipeline 200 performs the horizon detection pipeline 400 to detect the horizon within at least one of the image frames 300a. The received image frame 300a is down-sampled 402 to generate a down-sampled image frame 300b that has a reduced size as compared to the received image frame 300a. FIG. 6A illustrates an example of a down-sampled image frame 300b. Reducing the size of the image frame 300a facilitates decreasing computational time and/or enabling use of more computationally intensive algorithms in later stages of the pipeline 400 and/or the pipeline 200.

Figure 6B:
FIG. 6B illustrates a representative example of a grayscale image frame, in accordance with an implementation.
Figure 6C:
FIG. 6C illustrates a representative example of a blurred image frame, in accordance with an implementation.

The horizon detection pipeline 400 includes converting 404 the down-sampled image frame 300b to a grayscale image frame 300c. FIG. 6B illustrates an example of a grayscale image frame 300c. A blur is applied 406 to the grayscale image frame 300c to generate a blurred image frame 300d. FIG. 6C illustrates an example of a blurred image frame 300d. In some implementations, the blur applied to the grayscale image frame 300c is a Gaussian blur function, but any other type of blurring technique may be used in addition or alternatively to a Gaussian blur function.

Figure 6D:
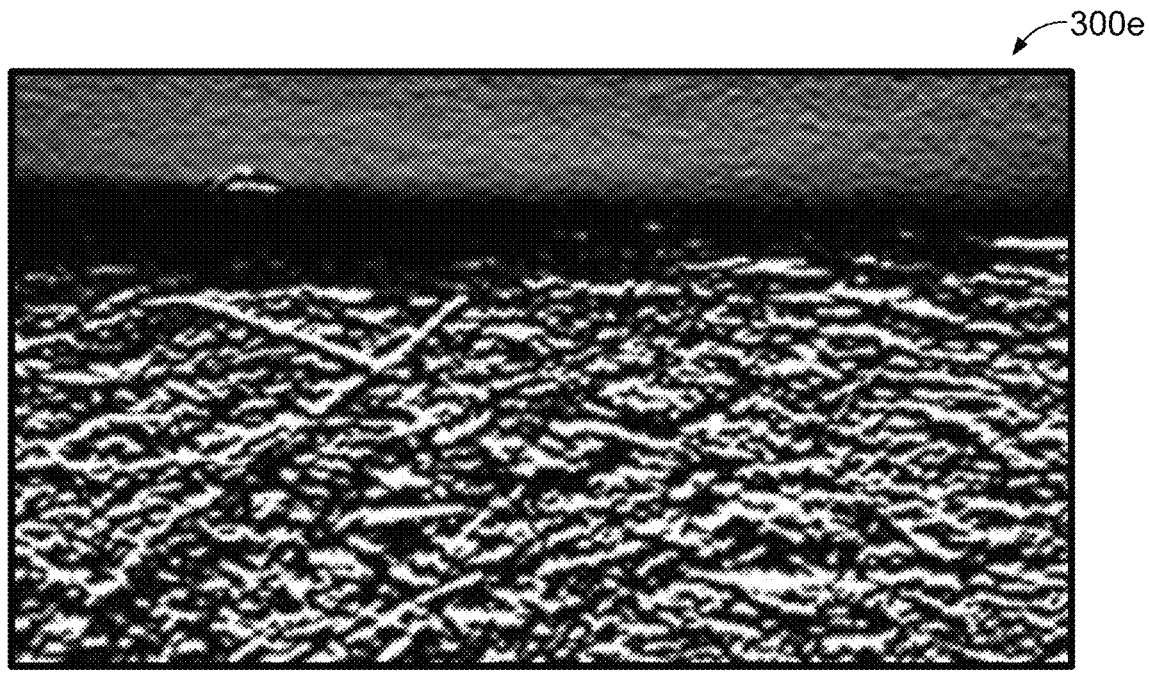
FIG. 6D illustrates a representative example of a filtered image frame, in accordance with an implementation.

A filter 408 of the horizon detection pipeline 400 filters the blurred image frame 300d, for example to pull out the edges of the blurred image frame 300d. The filter 408 generates a filtered image frame 300e, an example of which is shown in FIG. 6D. Any type of filter 408 may be used to filter the blurred image frame 300d, such as, but not limited to, a Sobel filter, a Kalmann filter, and/or the like.

Figure 6E:
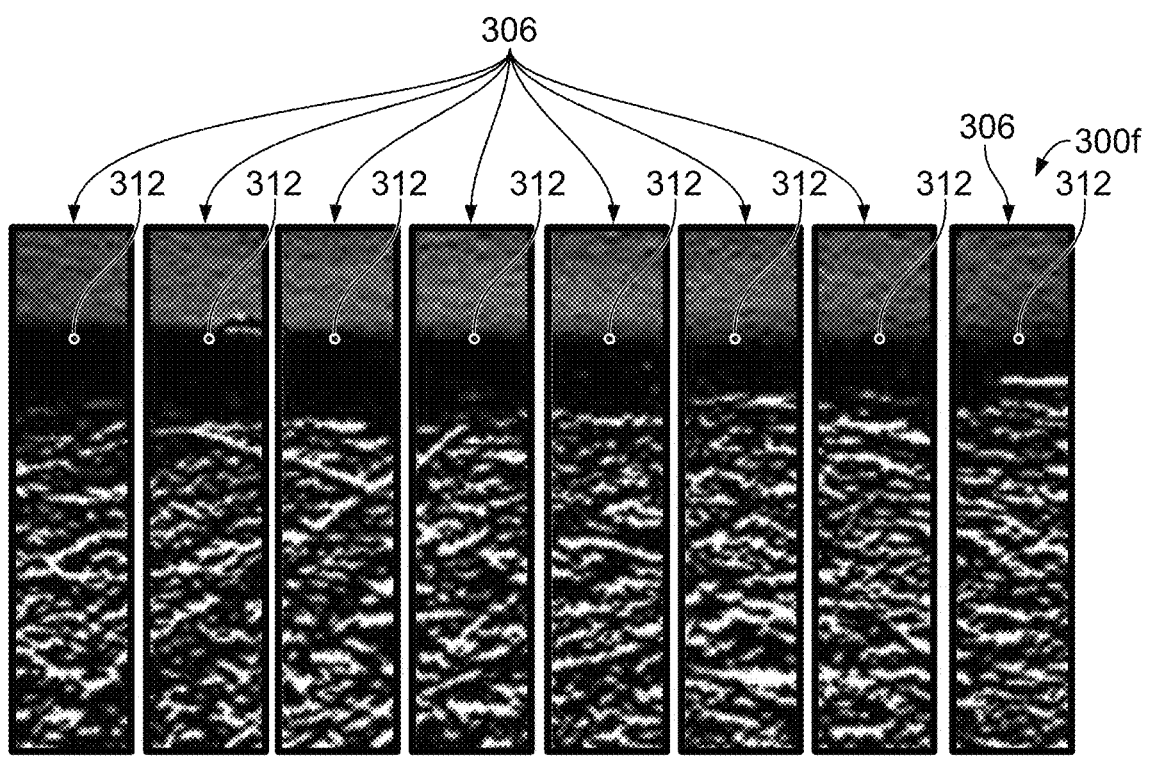
FIG. 6E illustrates a representative example of a segmented image frame, in accordance with an implementation.

The filtered image frame 300e is segmented 410 into a plurality of parts. FIG. 6E illustrates an example of a segmented image frame 300f resulting from a filtered image frame 300e that has been segmented into a plurality of parts. In the example of FIG. 6E, the filtered image frame 300e has been segmented vertically into a plurality of approximately vertical column strips 306. In addition or alternative to vertical segmentation (e.g., as shown in the example of FIG. 6E, etc.), the filtered image frame 300e may be segmented 410 in other orientations. Although eight column strips (i.e., parts) 306 are shown in the example of FIG. 6E, the segmented image frame 300f may include any number of parts (i.e., may be segmented into any number of parts). Increasing the number of parts into which the segmented mage frame 300f has been segmented increases the number of horizon points (described below), which may increase the accuracy, sensitivity, and/or the like of the horizon detected by the horizon detection pipeline 400.

The horizon is then detected 412 within the parts (e.g., the strips 306, etc.) of the segmented image frame 300f. For example, in some implementations one or more horizon points (e.g., the horizon points 312 shown in FIGS. 6E and 6F, etc.) is identified within each part of the segmented image frame 300f. In other implementations, one or more horizon points is identified within only some of the parts of the segmented image frame 300f. Each horizon point is an estimation of a boundary between the ground and the sky that lies within the corresponding part of the segmented image frame 300f. Some or all of the horizon points within the segmented image frame 300f can be connected together to form 414 a detected horizon across at least a portion of the segmented image frame 300f. For example, in some implementations a line is fitted across some or all of the identified horizon points of a segmented image frame 300f to generate a horizon line (e.g., the horizon line 304 shown in FIG. 4, etc.) that extends across at least a portion of the segmented image frame 300f. In other words, in some implementations some or all of the horizon points within a segmented image frame 300f are connected together to draw a horizon line that extends across at least a portion of the segmented image frame 300f.

Once the detected horizon has been formed across at least a portion of the segmented image frame 300f, the detected horizon is overlayed 416 onto the corresponding image frame 300a that was input into the horizon detection pipeline 400. The horizon detection pipeline 400 outputs the image frame 300a including the identification (e.g., line, etc.) of the detected horizon for subsequent processing within the object detection pipeline 200, as will be described below. As discussed above, FIG. 4 illustrates an example of an output of the horizon detection pipeline 400 (i.e., of the horizon detector 202). Specifically, FIG. 4 illustrates an image frame 300a that includes the horizon line 304, which identifies the detected horizon within the image frame 300a. Although shown as extending along a linear (i.e., straight) path, in other examples a horizon line detected by the horizon detector 202 includes one or more non-linear (e.g., angled, curved, etc.) segments.

Figure 6F:
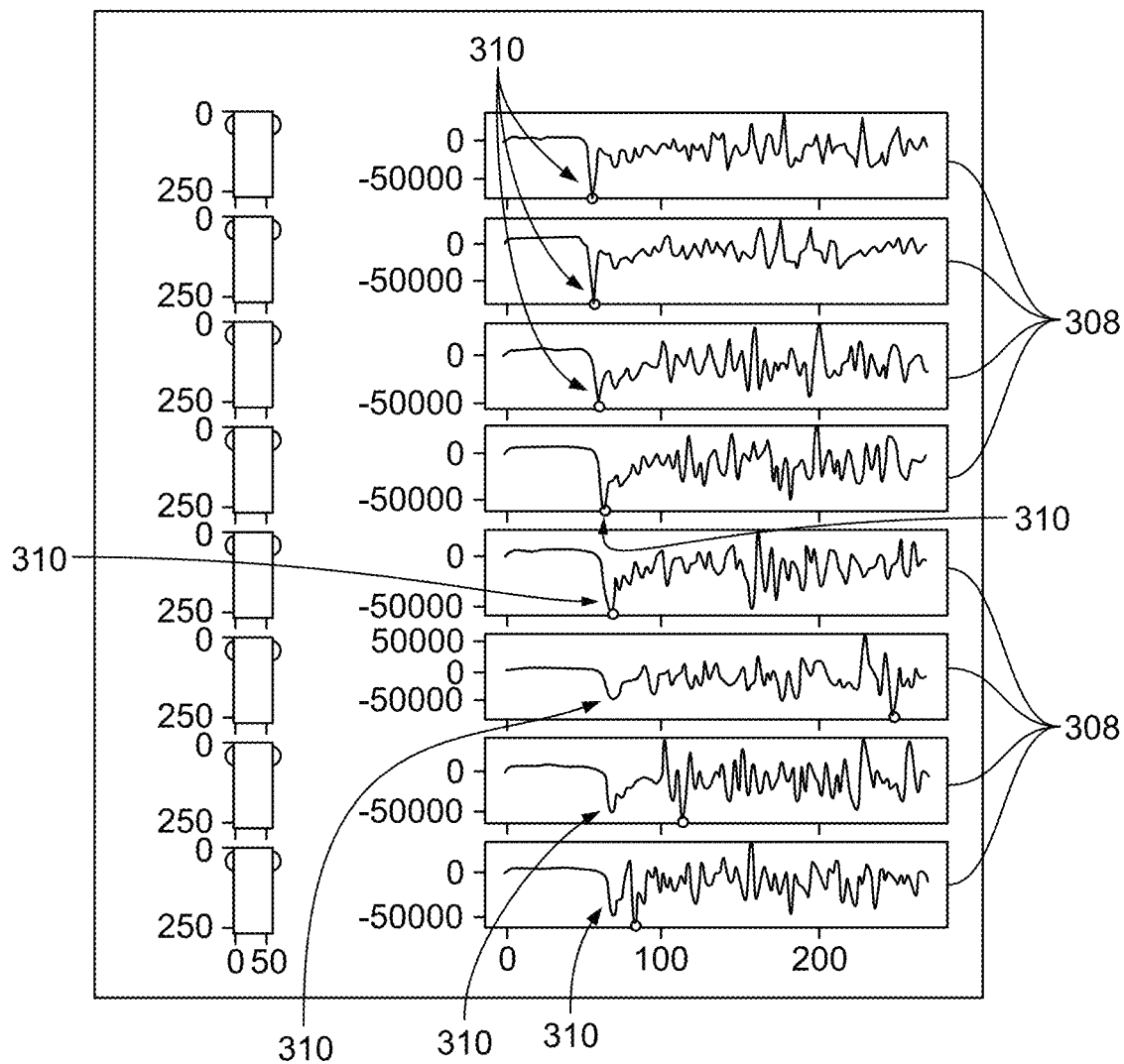
FIG. 6F illustrates a representative example of a histogram, in accordance with an implementation.

Although other techniques may be additionally or alternatively used, one example of a technique for identifying horizon points within the parts of a segmented image frame 300f includes generating histograms for the parts of the segmented image frame 300f and identifying horizon points within the parts using the histograms. For example, FIG. 6F illustrates examples of histograms 308 generated from corresponding strips 306 of the segmented image frame 300f shown in FIG. 6E. As shown in FIG. 6F, a negative spike 310 within a histogram 308 can be used to identify an estimated location of a horizon point 312 within the corresponding strip 306.

Figure 7A:
FIG. 7A illustrates a representative example of an image frame that has been segmented into first and second search regions, in accordance with an implementation.

Referring again to the object detection pipeline 200 shown in FIG. 3, the image frames 300a output from the horizon detector 202 (which include the identification of the detected horizon) are segmented 204 into two or more search regions, for example using the detected horizon. In the exemplary implementations shown and described herein, the image frames 300a output from the horizon detector 202 are segmented, using the detected horizon, into a first search region defined above the detected horizon and a second search region defined below the detected horizon. In other words, the first search region corresponds to the region within the image frame 300a occupied by the sky, while the second search region corresponds to the region within the image frame 300a occupied by the ground. FIG. 7A illustrates an example of an image frame 300a that has been segmented into a first search region 314 defined above the detected horizon line 304 and a second search region 316 defined below the detected horizon line 304.

As will be described below, segmenting the image frames 300a into different search regions enables the performance of a computer vision based movement search (e.g., the movement search 206 described below of the object detection pipeline 200, etc.) that is tailored to (e.g., catered to, optimized for, designed for, suited to, adapted to, etc.) at least two search regions that have different characteristics. In other words, each different search region searched by the movement search can be searched with a dedicated parameter set that has been selected to provide the most accurate results given the particular characteristics of that search region. For example, the region of the image frame 300a that is above the horizon (i.e., the region occupied by the sky) is generally less noisy and generally has fewer features as compared to the region of the image frame 300a that is below the horizon (i.e., the region occupied by the ground). Accordingly, in the exemplary implementation, segmenting the image frames 300a into the first and second search regions enables the movement search to be tailored to both the less noisy region above the horizon and the noisier region below the horizon.

Figure 7B:
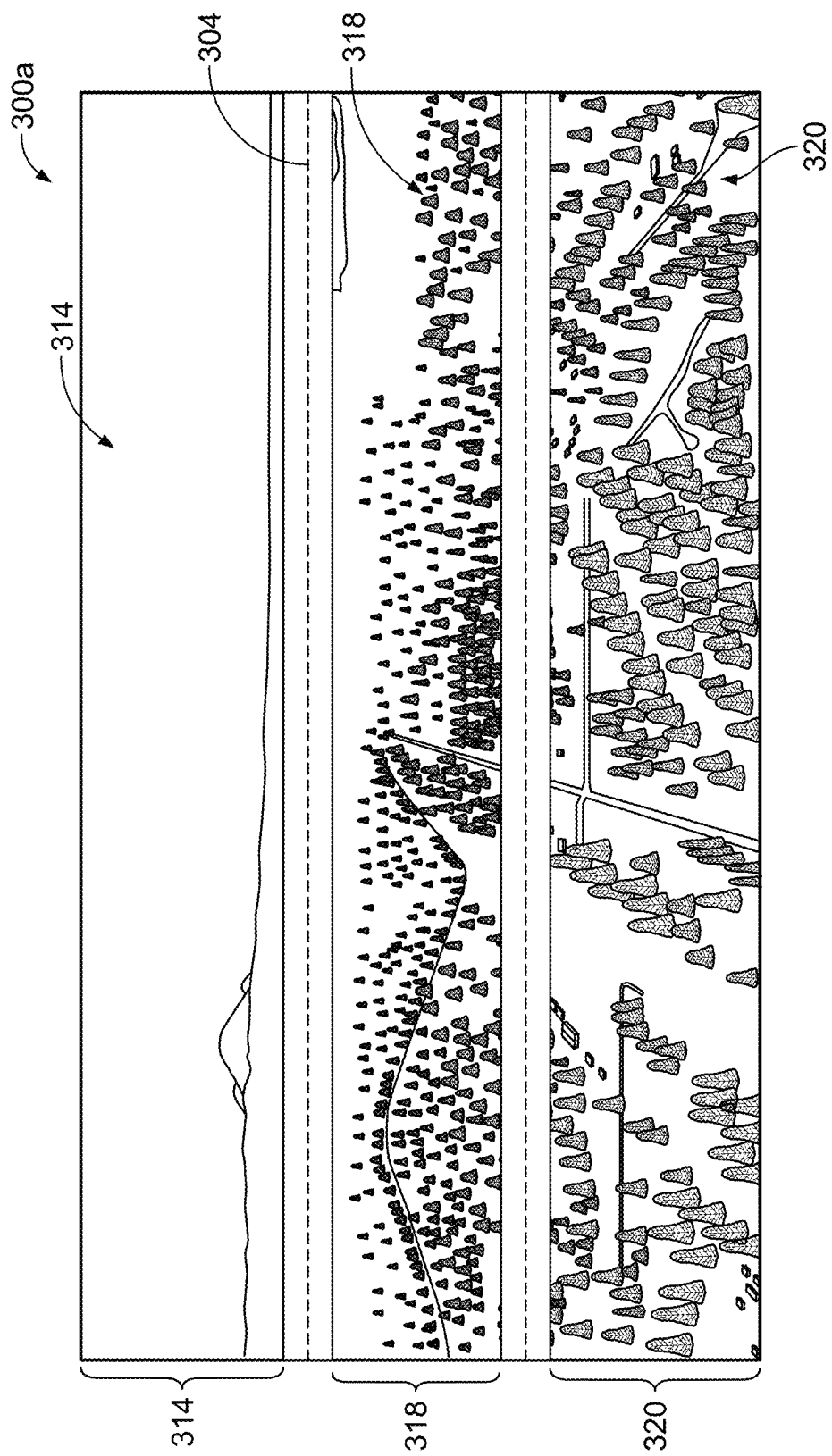
FIG. 7B illustrates a representative example of an image frame that has been segmented into three search regions, in accordance with an implementation.

Although only two search regions (i.e., the first and second search regions described above) are described in the exemplary implementation, the image frames 300a may be segmented into any number of search regions (e.g., three or more search regions, etc.), wherein each search region may correspond to any portion(s), section(s), area(s), location(s), region(s), and/or the like (e.g., sky, clouds, water, land, etc.) of the image frame 300a. For example, FIG. 7B illustrates an example of an image frame 300a that has been segmented into three search regions 314, 318, and 320, respectively. The search region 314 is defined above the detected horizon line 304, while the search regions 318 and 320 are defined below the detected horizon line 304. The search regions 318 and 320 enable the movement search to be tailored to different locations on the ground that may have different characteristics. For example, the search region 320 encompasses locations on the ground that are closer to the aircraft 104 and therefore may be generally noisier and may generally include more features as compared to the search region 318, which is farther away from the aircraft 104.

The object detection pipeline 200 performs the movement search 206 on the first and second search regions of the image frames 300a. The movement search 206 is a computer vision movement search that searches the first and second search regions for motion vector fields across the image frames 300a (e.g., across two consecutive image frames 300a, etc.). In other words, the movement search 206 determines whether the first and second search region contains any motion vector fields across the image frames 300a. As used herein, a "motion vector field" is intended to mean a two dimensional (2D) vector field where each vector is a displacement vector showing the movement of points from the first image frame to the second image frame. In some implementations, the movement search 206 is performed using an optical flow algorithm (e.g., Farneback method, etc.) that monitors movement of each individual pixel across two or more image frames 300a. Optical flow is the pattern of apparent motion of objects between two image frames caused by the movement of the object or the camera. In addition or alternatively to an optical flow algorithm, any other technique may be used to perform the movement search 206 that enables the movement search 206 to function as described and/or illustrated herein.

Figure 7C:
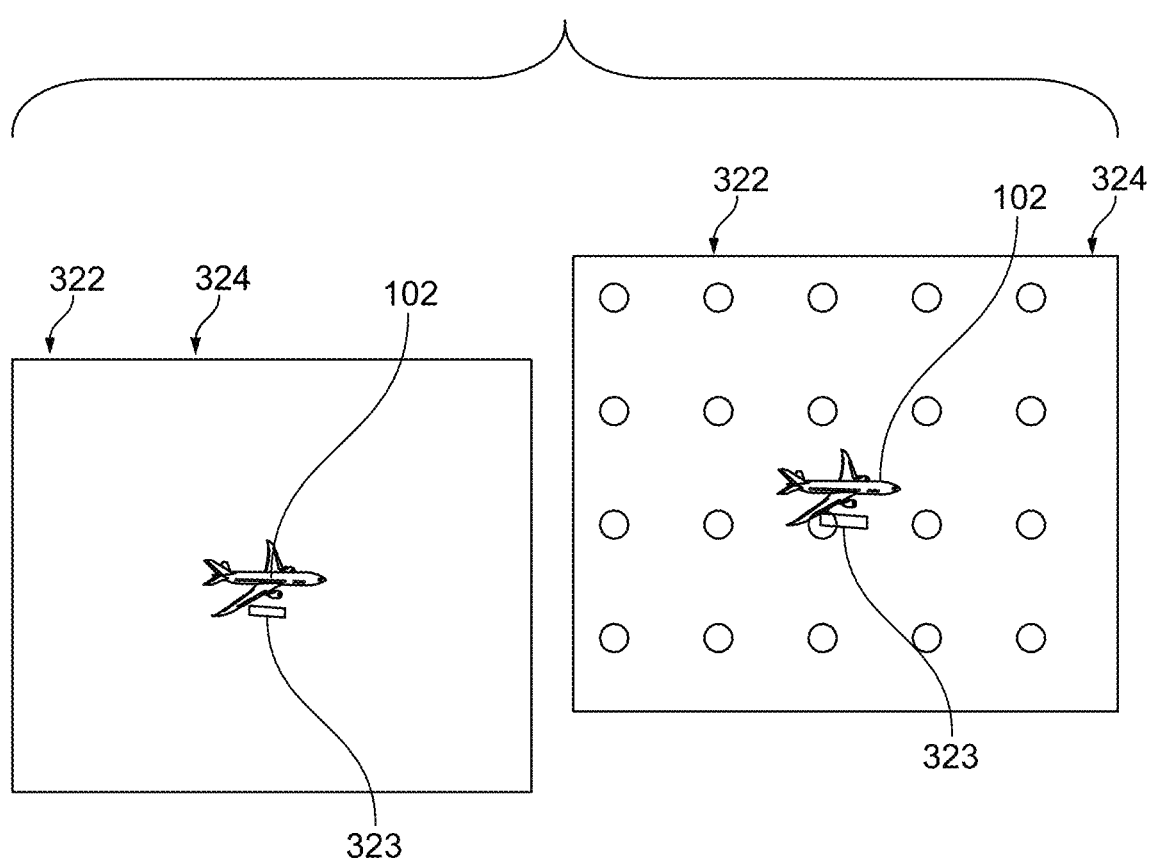
FIG. 7C illustrates a representative example of a detection proposal, in accordance with an implementation.
Figure 7D:
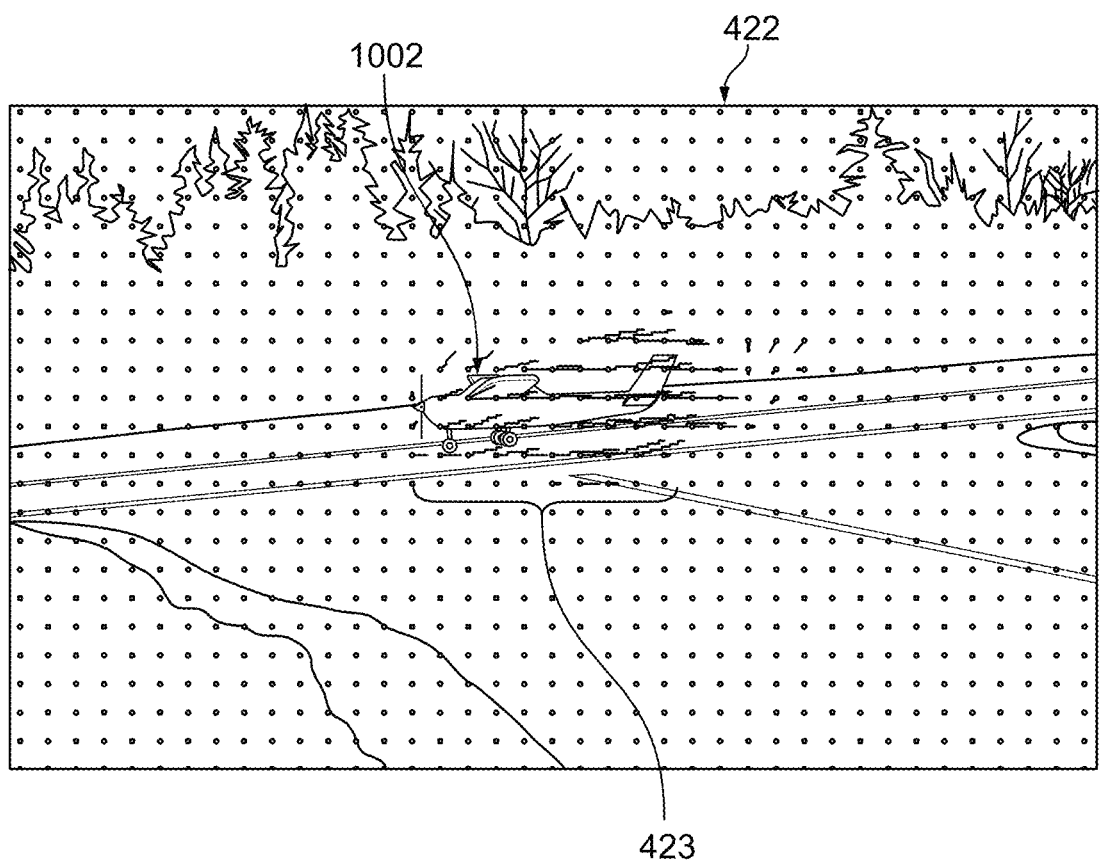
FIG. 7D illustrates a representative example of a vector motion field, in accordance with an implementation.

The movement search 206 includes searching 206a the first search region using a first parameter set and searching 206b the second search region using a second parameter set. For example, the movement search 206 determines whether the first search region includes any motion vector fields across the image frames 300a using the first parameter set, and the movement search 206 determines whether the second search region includes any motion vector fields across the image frames 300a using the second parameter set. As described below, the first and second parameter sets may be different as compared to each other. As used herein, the term "different" as used in reference to the first and second parameter sets means that first parameter set contains at least one parameter that has a different value as compared to the corresponding parameter of the second parameter set. Accordingly, the first and second parameter sets may contain at least one parameter value in common (i.e., the first and second parameter sets may have one or more overlapping parameter values). Examples of motion vector fields 322 and 422 determined by the movement search 206 are illustrated in FIGS. 7C and 7D. For example, FIG. 7C illustrates a displacement vector 323 within the motion vector field 322, while FIG. 7D illustrates a plurality of displacement vectors 423 within the motion vector field 422. FIG. 7D also illustrates an example of using the object detection pipeline 400 for ground traffic management. For example, the motion vector field 422 of FIG. 7D illustrates use of the pipeline 400 for avoiding collisions with dynamic objects (e.g., the aircraft 1002, ground vehicles, etc.) on the ground (e.g., while the aircraft 104 is taxiing to takeoff or from landing, etc.).

The first parameter set is tailored to the first search region that extends above the horizon for providing the most accurate results given the generally less noisy and generally fewer features of the first search region. The second parameter set is tailored to the second search region that extends below the horizon for providing the most accurate results given the generally more noisy and generally greater number of features of the second search region. For example, in implementations performing the movement search using optical flow algorithms, different parameters are needed to generate flow fields in differing backgrounds. Accordingly, the first parameter set is tailored to the background of the first search region, for example for generating flow fields tailored to the generally less noisy and fewer features of the first search region, and the second parameter set is tailored to the background of the second search region, for example for generating flow fields tailored to the generally more noisy and greater number of features of the second search region.

The first parameter set may be generally less sensitive as compared to the second parameter set because the first search region is generally less noisy and has fewer features than the second search region. In other words, the magnitude of the motion vector fields determined by the first parameter set within the first search region may be less than the magnitude of the motion vector fields determined by the second parameter set within the second search region. For example, in some implementations, the first and second parameter sets are configured to identify movement (e.g., motion vector fields, displacement vectors, etc.) that is greater than the average movement of the background of the respective first and second search region. As the average movement of the background is less in the first search region that extends above the horizon (and objects above the horizon are generally smaller than objects below the horizon), the first parameter set may be less sensitive as compared to the second parameter set for determining a smaller overall magnitude of movement. Similarly, as the average movement of the background is greater in the second search region that extends below the horizon (and objects below the horizon are generally larger than objects above the horizon), the second parameter set may be more sensitive as compared to the first parameter set for determining a larger overall magnitude of movement.

Segmentation of the image frames 300a into at least the first and second search regions that can be searched with dedicated parameter sets (e.g., the first and second parameter sets described above, etc.) improves the accuracy of the movement search, reduces the computational load of the movement search, and provides a more efficient and directed search.

In some implementations, the values of the first and second parameter sets are determined using a heuristic approach. For example, the values of the first and second parameter sets can be determined by iteratively applying candidate parameter sets to reference image frames 300a that include a known dynamic object (e.g., a known ground truth, etc.). Specifically, in some implementations different first candidate parameter sets are iteratively used to perform the movement search 206a of the first search region within a reference image frame 300a that includes a known dynamic object in the first search region, and different second candidate parameter sets are iteratively used to perform the movement search 206b of the second search region within a reference image frame 300a that includes a known dynamic object in the second search region. In some implementations, the reference image frame 300a used to evaluate the first candidate parameter sets is a different reference image frame 300a as compared to the reference image frame 300a used to evaluate the second candidate parameter sets.

The abilities of the first and second candidate parameter sets applied to the reference image frame(s) 300a to detect the corresponding known dynamic objects are evaluated based on the movement searches 206a and 206b. For example, the ability of each of the first candidate parameter sets to determine a motion vector field that corresponds to the known dynamic object within the first search region is evaluated, and the ability of each of the second candidate parameter sets to determine a motion vector field that corresponds to the known dynamic object within the second search region is evaluated. One or more of the first candidate parameter sets is then selected as the first parameter set based on the evaluation of the ability of each of the first candidate parameter sets to detect the known dynamic object (e.g., based on the detection accuracy of the first candidate parameter sets, etc.). Similarly, one or more of the second candidate parameter sets is selected as the second parameter set based on the evaluation of the ability of each of the second candidate parameter sets to detect the known dynamic object (e.g., based on the detection accuracy of the second candidate parameter sets, etc.). In some implementations, parameter sets are associated based on the relative spatial relationship in the image frame 300a, for example whether the region is above the other region(s) (e.g., sky region is assumed to always be above the ground region for commercial aircraft that do not fly upside down, etc.), etc.

The movement search 206 outputs any motion vector fields determined thereby in the first and second search regions of the image frames 300a, for example as one or more image frames 300a having at least one determined motion vector field indicated (e.g., overlaid, drawn, etc.) thereon. The object detection pipeline 200 includes identifying 208 detection proposals (i.e., candidate dynamic objects) using motion vector fields that have been determined by the movement search 206. In other words, the motion vector fields output from the movement search 206 may be evaluated and selected as candidate dynamic objects based on the evaluation. For example, the magnitude of a motion vector field and/or displacement vector therein determined by the movement search 206 within the first search region may be compared to a threshold magnitude and selected as a detection proposal if the magnitude of the determined motion vector field and/or displacement vector therein is greater than the threshold. Similarly, and for example, the magnitude of a motion vector field and/or displacement vector determined by the movement search 206 within the second search region may be compared to a threshold magnitude and selected as a detection proposal if the magnitude of the determined motion vector field and/or displacement vector is greater than the threshold.

In some implementations, one or more of the image frames 300a is cropped around a region of interest, for example a region of interest that includes a displacement vector (within a motion vector field) determined by the movement search 206. Accordingly, some implementations of a detection proposal include only the cropped region of interest and therefore only a portion of an image frame 300a. In some implementations, the size of the cropped region of interest is based on a magnitude of the motion vector field and/or displacement vector(s) contained therein. FIG. 7C illustrates examples of detection proposals 324 that are cropped regions of interest that include motion vector fields 322 and displacement vectors 323 therein.

The detection proposals can be used in a variety of ways to output a detected dynamic object 102 from the object detection pipeline 200. For example, in some implementations the identified detection proposals are considered (e.g., determined, selected, etc.) 210 to be dynamic objects 102 detected in the visual line of sight of the aircraft 104 with no further processing of the detection proposals by the object detection pipeline 200. For example, the detection proposals may be used as a form of alternative redundancy when other systems (e.g., machine learning, neural networks, deterministic systems, etc.) that would possibly be used to further process the detection proposals are inoperational (e.g., down, etc.) or otherwise unavailable. In another example, detection proposals identified from the movement search 206 are considered sufficiently accurate to be considered valid detected dynamic objects 102 without further processing.

In some implementations, and for example, the detection proposals are input 212 into a neural network (e.g., a convolutional neural network (CNN), another type of neural network, etc.) for further processing by the neural network, for example to detect and classify dynamic objects 102 (e.g., detect and classify identified detection proposals as dynamic objects 102, etc.) using the neural network, to determine whether the identified detection proposals are valid detected dynamic objects 102, to train the neural network, etc. In other words, in some implementations the movement search 206 and resulting identification of the detection proposals are pre-processing for a neural network. Moreover, some examples include applying 214 machine learning to the identified detection proposals, for example to detect and classify dynamic objects 102 (e.g., detect and classify identified detection proposals as dynamic objects 102, etc.) using machine learning, to determine whether the identified detection proposals are valid detected dynamic objects 102, for training, etc. In one example, the detection proposals are used as auto-labeling for machine learning. In some implementations, and for example, a deterministic algorithm is applied 216 to the identified detection proposals, for example to detect and classify dynamic objects 102 (e.g., detect and classify identified detection proposals as dynamic objects 102, etc.) using the deterministic algorithm, to determine whether the identified detection proposals are valid detected dynamic objects 102, for training, etc.

In implementations wherein the detection proposals are cropped regions of interest (e.g., as described above, etc.), the reduced-size detection proposals provide a more manageable size for the neural networks, machine learning, deterministic algorithms, and/or the like to process, thereby decreasing computational time (i.e., enabling faster object detection performance; e.g., 1-10 hertz, etc.) and therefore providing a more efficient search, for example as compared to the performance (e.g., 0.1 hertz, etc.) of known techniques wherein full-size image frames are processed.

Figure 8:
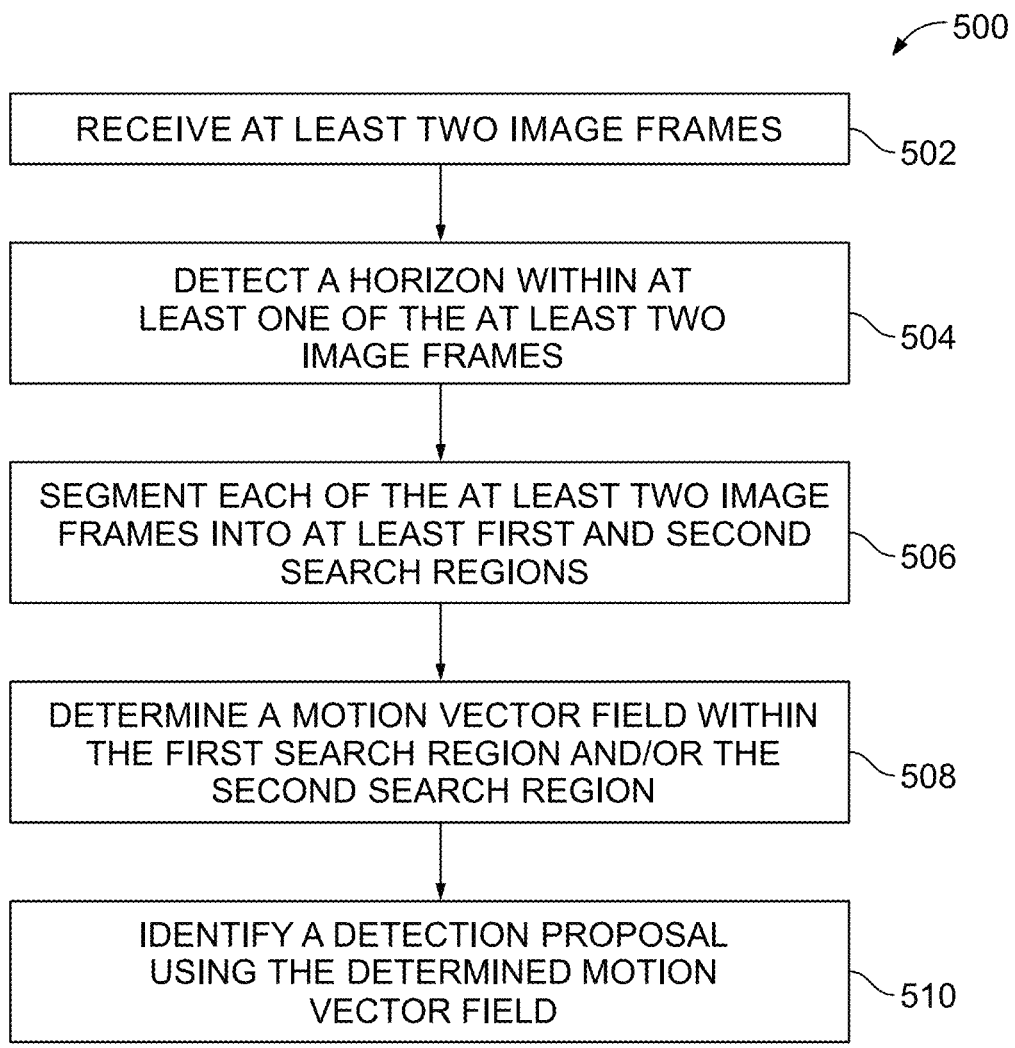
FIG. 8 is a flow chart illustrating a method for detecting a dynamic object in a visual line of sight of an aircraft, in accordance with an implementation.

FIG. 8 is a flow chart illustrating a method 500 for detecting a dynamic object in a visual line of sight of an aircraft. In some examples, the operations illustrated in FIG. 8 are performed, at least in part, by executing instructions 702a (stored in the memory 702) by the one or more processors 704 of the computing device 700 of FIG. 10. For example, the object detection pipeline 200 can be trained on a first example of the computing device 700 and then deployed on a second (different) example of the computing device 700.

The method 500 includes receiving, at 502, at least two image frames. At 504, the method 500 includes detecting a horizon within at least one of the at least two image frames. At 506, the method 500 includes segmenting each of the at least two image frames into at least first and second search regions using the detected horizon. The first search region is defined above the detected horizon in the at least two image frames. The second search region is defined below the horizon in the at least two image frames. At 508, the method 500 includes determining, across the at least two image frames, a motion vector field within at least one of the first search region or the second search region. The method 500 includes identifying, at 510, a detection proposal using the determined motion vector field.

Figure 9:
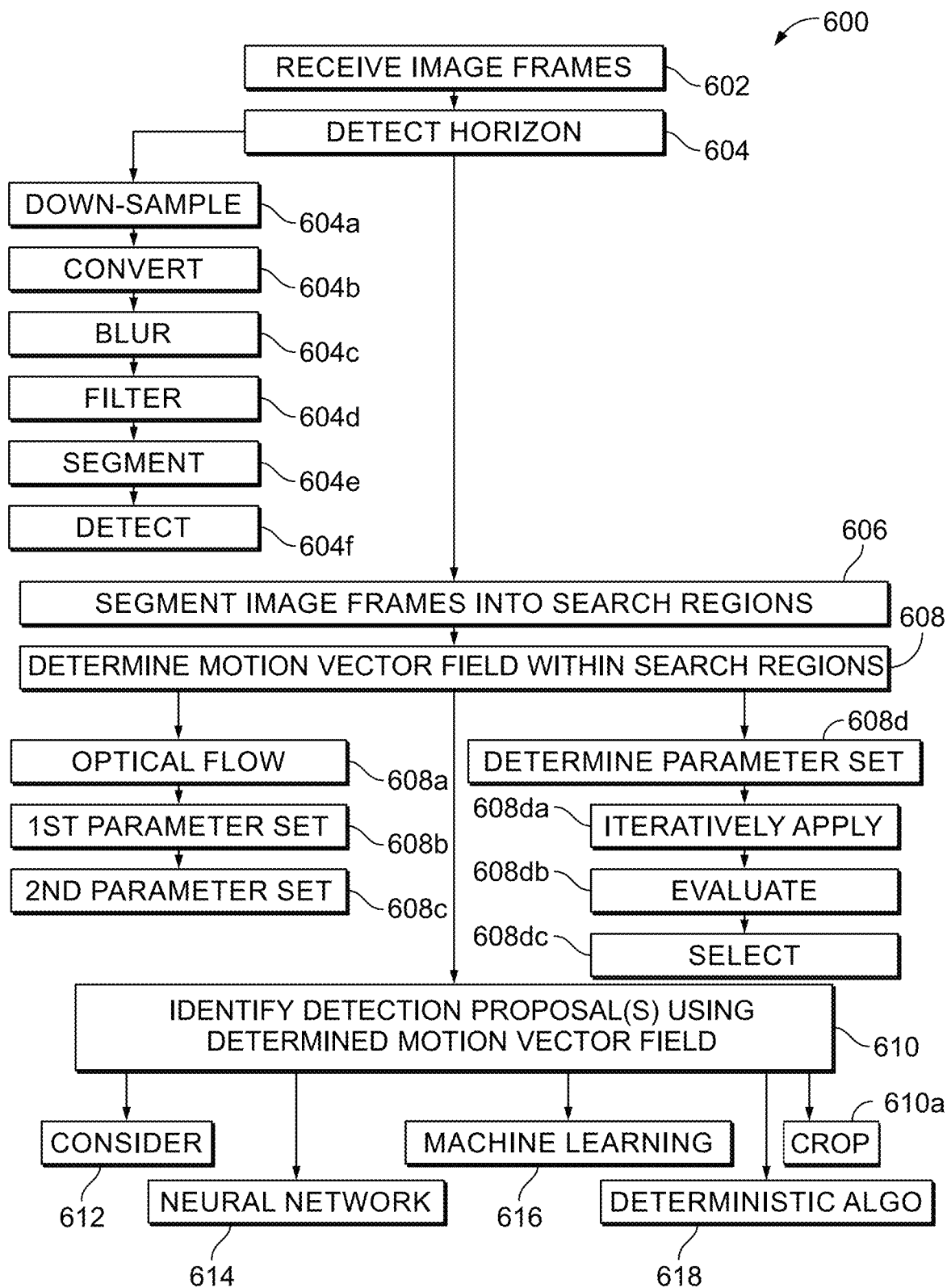
FIG. 9 is a flow chart illustrating a method for detecting a dynamic object in a visual line of sight of an aircraft, in accordance with an implementation.

FIG. 9 is a flow chart illustrating a method 600 for detecting a dynamic object in a visual line of sight of an aircraft. In some examples, the operations illustrated in FIG. 9 are performed, at least in part, by executing instructions 702a (stored in the memory 702) by the one or more processors 704 of the computing device 700 of FIG. 10. For example, the object detection pipeline 200 can be trained on a first example of the computing device 700 and then deployed on a second (different) example of the computing device 700.

The method 600 includes receiving, at 602, at least two image frames. At 604, the method 600 includes detecting a horizon within at least one of the at least two image frames. In some implementations, detecting at 604 the horizon within the at least two image frames includes: down-sampling, at 604a, the at least one image frame; converting, at 604b, the at least one image frame to grayscale; blurring, at 604c, the at least one image frame; filtering, at 604d, the at least one image frame to pull out the edges of the at least one image frame; segmenting, at 604e, the at least one image frame into a plurality of parts; and detecting, at 604f, the horizon in the parts.

At 606, the method 600 includes segmenting each of the at least two image frames into at least first and second search regions using the detected horizon. The first search region is defined above the detected horizon in the at least two image frames. The second search region is defined below the horizon in the at least two image frames.

At 608, the method 600 includes determining, across the at least two image frames, a motion vector field within at least one of the first search region or the second search region. In some implementations, determining at 608, across the at least two image frames, the motion vector field within at least one of the first search region or the second search region includes determining, at 608a, the motion vector field using an optical flow algorithm. In some implementations, determining at 608, across the at least two image frames, the motion vector field within at least one of the first search region or the second search region includes: determining, at 608b, whether the first search region includes a motion vector field using a first parameter set; and determining, at 608c, whether the second search region includes a motion vector field using a second parameter set. The method 600, in some implementations, includes determining, at 608d, at least one of the first parameter set or the second parameter set by: iteratively applying, at 608da, candidate parameter sets to reference image frames that include a known dynamic object; evaluating, at 608db, the ability of the applied candidate parameter sets to detect the known dynamic object; and selecting, at 608dc one of the candidate parameter sets as the first parameter set or the second parameter set based on the evaluation of the ability of the applied candidate parameter sets to detect the known dynamic object.

At 610, the method 600 includes identifying a detection proposal using the determined motion vector field. In some implementations, identifying at 610 the detection proposal using the determined motion vector field includes cropping, at 610a, at least one of the at least two image frames around a region of interest.

In some implementations, the method 600 further includes considering, at 612, the detection proposal to be a detected dynamic object. Some implementations of the method 600 further include inputting, at 614, the detection proposal into a neural network to detect and classify the dynamic object using the neural network. Moreover, in some implementations, the method 600 further includes applying, at 616, machine learning to detect and classify the dynamic object. In some implementations, the method 600 further includes applying, at 618, a deterministic algorithm to determine whether the detection proposal includes a detected dynamic object.

Figure 10:
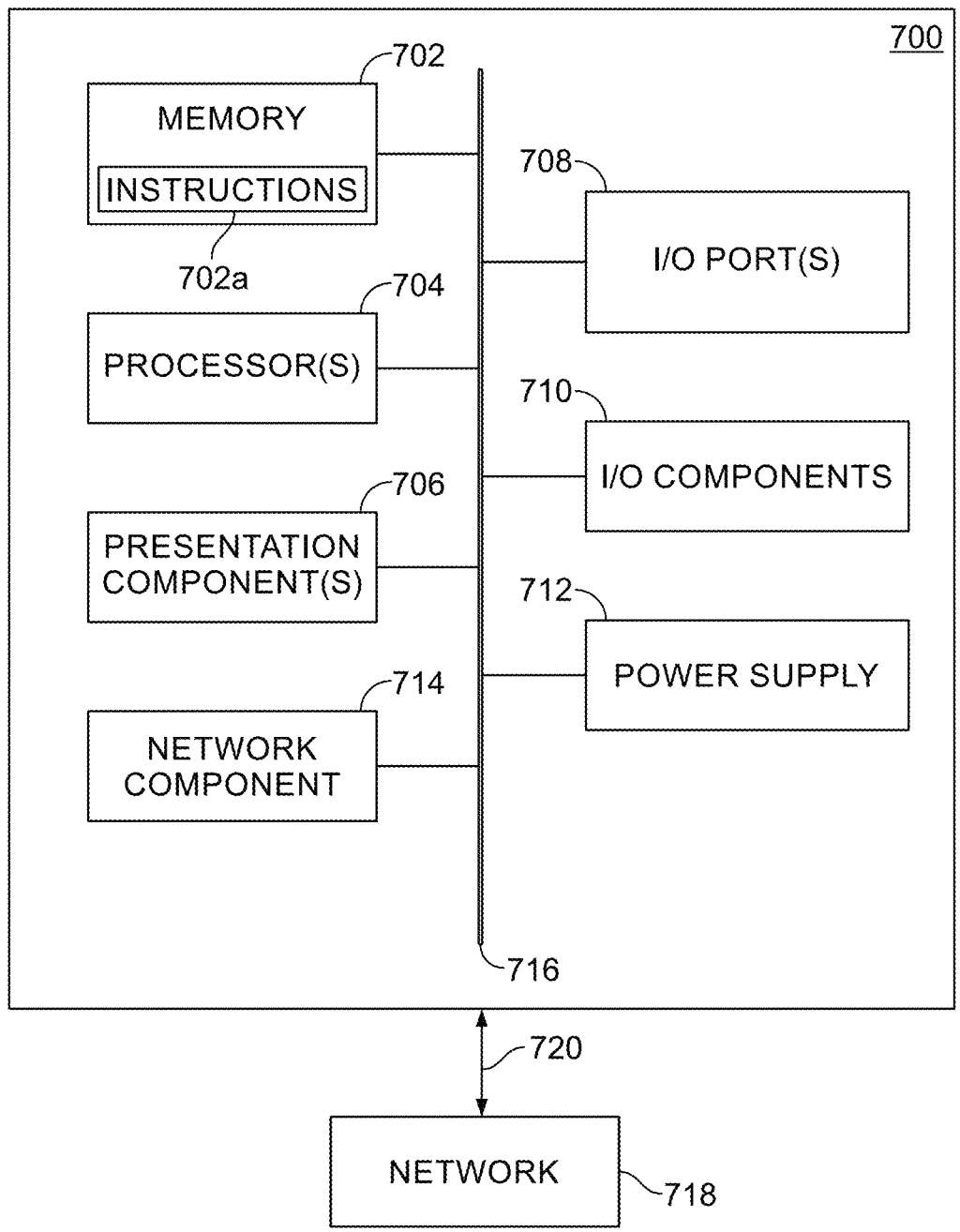
FIG. 10 is a block diagram of a computing device suitable for implementing various implementations of the disclosure, in accordance with an implementation.

The present disclosure is operable with an electronic device (i.e., a computing apparatus, computing device, etc.) according to an implementation as a functional block diagram 700 in FIG. 10. In an implementation, components of a computing apparatus 718 are implemented as a part of an electronic device according to one or more implementations described in this specification. The computing apparatus 718 comprises one or more processors 719, for example microprocessors, controllers, and/or any other suitable type of processors for processing computer executable instructions to control the operation of the electronic device. In some implementations, platform software comprising an operating system 720 and/or any other suitable platform software is provided on the apparatus 718 to enable application software 721 to be executed on the device.

Computer executable instructions are provided using any computer-readable media that are accessible by the computing apparatus 718. Computer-readable media include, for example and without limitation, computer storage media such as a memory 722 and communications media. Computer storage media, such as a memory 722, include volatile and non-volatile, removable and non-removable, media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media embody computer readable instructions, data structures, program modules, and/or the like in a modulated data signal, such as a carrier wave and/or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that in some implementations the storage is distributed or located remotely and accessed via a network or other communication link (e.g. using a communication interface 723).

In some implementations, the computing apparatus 718 comprises an input/output controller 724 configured to output information to one or more output devices 725, for example a display and/or a speaker, which is separate from or integral to the electronic device. The input/output controller 724 is also configured, in some implementations, to receive and process an input from one or more input devices 726, for example, a keyboard, a microphone, and/or a touchpad. In one implementation, the output device 725 also acts as the input device. An example of such a device is a touch sensitive display. In some implementations, the input/output controller 724 also outputs data to devices other than the output device, e.g. a locally connected printing device. In some implementations, a user provides input to the input device(s) 726 and/or receives output from the output device (s) 725.

In some implementations, the functionality described herein is performed, at least in part, by one or more hardware logic components. According to an implementation, the computing apparatus 718 is configured by the program code when executed by the processor 719 to execute the implementations of the operations and functionality described. Alternatively, or in addition, the functionality described herein is performed, at least in part, by one or more hardware logic components. For example, and without limitation, illustrative types of hardware logic components include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs), and/or the like.

Although described in connection with the computing device 700, implementations of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one implementation, the computer-executable instructions are organized into one or more computer-executable components or modules. Generally, program modules include, but are not limited to, routines, programs, objects, components, and data structures that perform particular tasks or implement particular abstract data types. In one implementation, implementations of the disclosure are implemented with any number and organization of such components or modules. For example, implementations of the disclosure are not limited to the specific computer-executable instructions or the specific components or modules illustrated in the figures and described herein. Other implementations of the disclosure include different computer-executable instructions or components having more or less functionality than illustrated and described herein. In implementations involving a general-purpose computer, implementations of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one implementation, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

Figure 11:
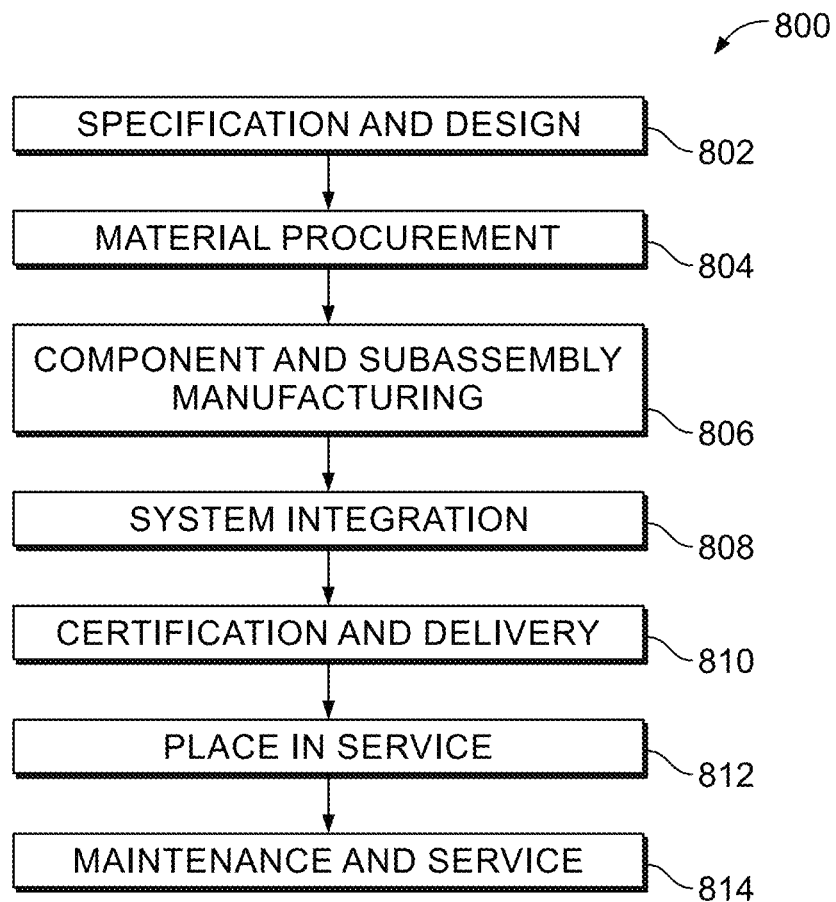
FIG. 11 is a block diagram of an apparatus production and service method that employs various implementations of the disclosure, in accordance with an implementation.
Figure 12:
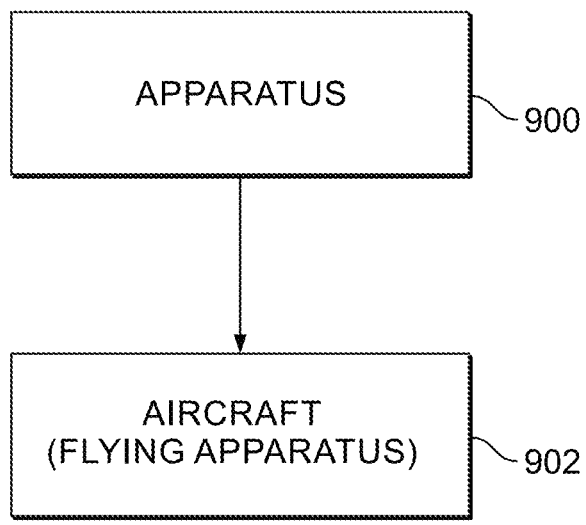
FIG. 12 is a block diagram of an apparatus for which various implementations of the disclosure can be employed, in accordance with an implementation.
Figure 13:
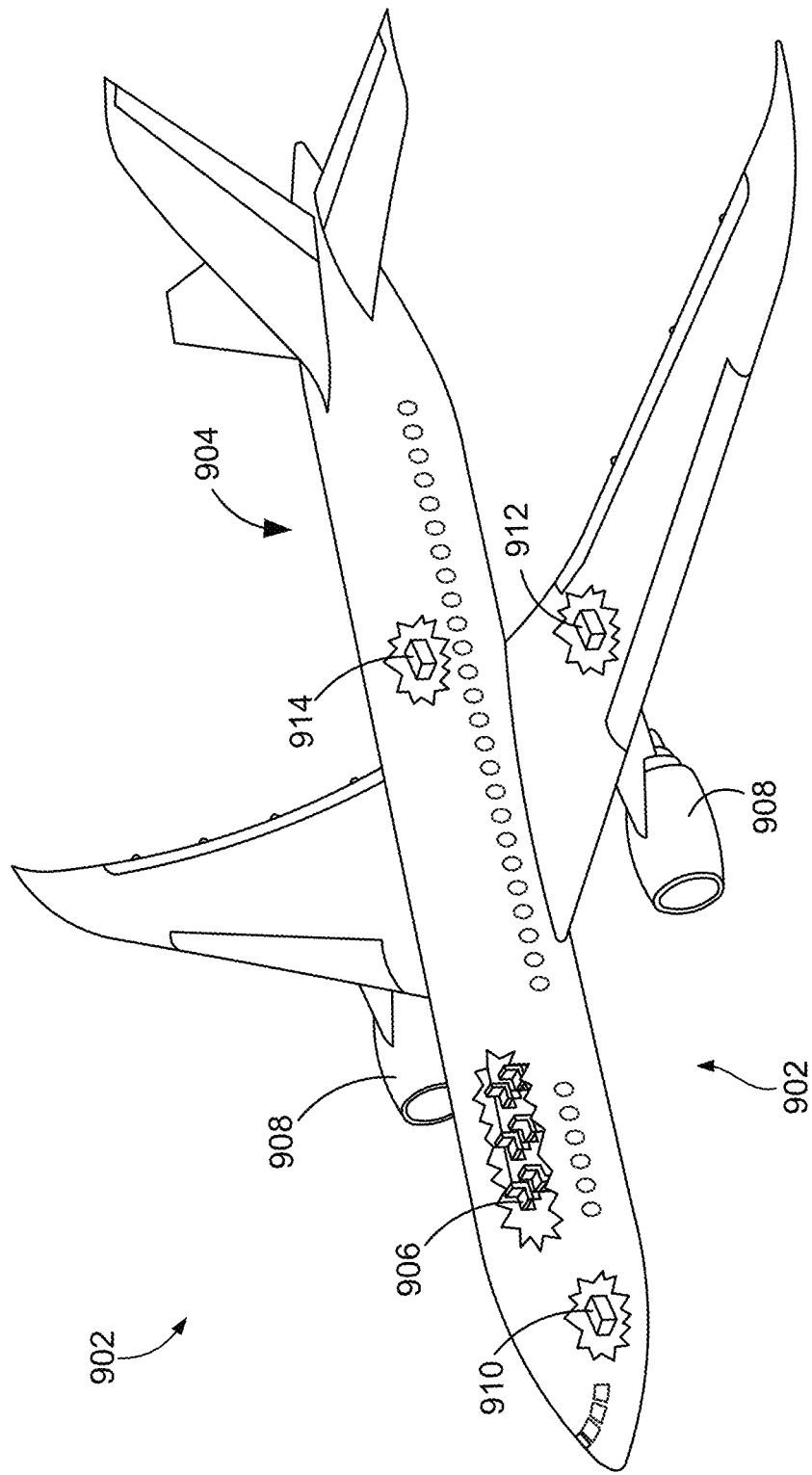
FIG. 13 is a schematic view of an aircraft, in accordance with an implementation.

Some implementations of the disclosure are used in manufacturing and service applications as shown and described in relation to FIGS. 11-13. Thus, implementations of the disclosure are described in the context of an apparatus manufacturing and service method 800 shown in FIG. 11 and apparatus 900 shown in FIG. 12. In FIG. 11, a diagram illustrating an apparatus manufacturing and service method 800 is depicted in accordance with an implementation. In one implementation, during pre-production, the apparatus manufacturing and service method 800 includes specification and design 802 of the apparatus 900 in FIG. 12 and material procurement 804. During production, component, and subassembly manufacturing 806 and system integration 808 of the apparatus 900 in FIG. 12 takes place. Thereafter, the apparatus 900 in FIG. 12 goes through certification and delivery 810 in order to be placed in service 812. While in service by a customer, the apparatus 900 in FIG. 12 is scheduled for routine maintenance and service 814, which, in one example, includes modification, reconfiguration, refurbishment, and other maintenance or service subject to configuration management, described herein.

In one implementation, each of the processes of the apparatus manufacturing and service method 800 are performed or carried out by a system integrator, a third party, and/or an operator. In these examples, the operator is a customer. For the purposes of this description, a system integrator includes any number of apparatus manufacturers and major-system subcontractors; a third party includes any number of venders, subcontractors, and suppliers; and in one example, an operator is an owner of an apparatus or fleet of the apparatus, an administrator responsible for the apparatus or fleet of the apparatus, a user operating the apparatus, a leasing company, a military entity, a service organization, or the like.

With reference now to FIG. 12, the apparatus 900 is provided. As shown in FIG. 12, an example of the apparatus 900 is a flying apparatus 902, such as, but not limited to, an aerospace vehicle, aircraft, air cargo, flying car, satellite, planetary probe, deep space probe, solar probe, and/or the like. It is contemplated as being within the scope of this disclosure that the implementations of the present disclosure may be used for the following: (1) horizon detection from a spacecraft for detecting other spacecraft (e.g., satellites, orbiting debris, etc.) in a visual line of sight of the spacecraft; (2) ground traffic management, for example avoiding collisions with dynamic objects (e.g., other aircraft, ground vehicles, etc.) while an aircraft is on the ground (e.g., while the aircraft is taxiing to takeoff or from landing, etc.); (3) collision avoidance while a spacecraft and/or aircraft is launching; and/or (4) searching for moving objects from a telescope (e.g., with greater than 4K-sized images, etc.).

With reference now to FIG. 13, a more specific diagram of the flying apparatus 902 is depicted in which an implementation of the disclosure is advantageously employed. In this implementation, the flying apparatus 902 is an aircraft produced by the apparatus manufacturing and service method 800 in FIG. 11 and includes a plurality of systems 904 and an interior 906. Examples of the plurality of systems 904 include one or more of a propulsion system 908, an electrical system 910, a hydraulic system 912, and an environmental system 914. However, other systems are also candidates for inclusion. Although an aerospace example is shown, different advantageous examples are applied to other industries.

The implementations disclosed herein are described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed implementations are practiced in a variety of system configurations, including personal computers, laptops, smart phones, mobile tablets, hand-held devices, consumer electronics, specialty computing devices, etc. The disclosed implementations are also practiced in distributed computing environments, where tasks are performed by remote-processing devices that are linked through a communications network. At least a portion of the functionality of the various elements in the figures can be performed by other elements in the figures, or an entity (e.g., processor, web service, server, application program, computing device, etc.) not shown in the figures.

The following clauses describe further aspects:

Clause Set A:

A1. A computer-implemented method for detecting a dynamic object in a visual line of sight of an aircraft, the method comprising implementing, by a computer system, the following operations:
receiving at least two image frames;
detecting a horizon within at least one of the at least two image frames;
segmenting each of the at least two image frames into at least first and second search regions using the detected horizon, wherein the first search region is defined above the detected horizon in the at least two image frames and the second search region is defined below the horizon in the at least two image frames;
determining, across the at least two image frames, a motion vector field within at least one of the first search region or the second search region; and
identifying a detection proposal using the determined motion vector field.

A2. The method of any preceding clause, further comprising considering the detection proposal to be a detected dynamic object.

A3. The method of any preceding clause, further comprising inputting the detection proposal into a neural network to detect and classify the dynamic object using the neural network.

A4. The method of any preceding clause, further comprising applying machine learning to detect and classify the dynamic object.

A5. The method of any preceding clause, further comprising applying a deterministic algorithm to determine whether the detection proposal includes a detected dynamic object.

A6. The method of any preceding clause, wherein detecting the horizon within at least one of the at least two image frames comprises:
down-sampling the at least one image frame;
converting the at least one image frame to grayscale;
blurring the at least one image frame;
filtering the at least one image frame to pull out edges of the at least one image frame;
segmenting the at least one image frame into a plurality of parts; and
detecting the horizon in the parts.

A7. The method of any preceding clause, wherein determining, across the at least two image frames, the motion vector field within at least one of the first search region or the second search region comprises determining the motion vector field using an optical flow algorithm.

A8. The method of any preceding clause, wherein determining, across the at least two image frames, the motion vector field within at least one of the first search region or the second search region comprises:
determining whether the first search region includes a motion vector field using a first parameter set; and
determining whether the second search region includes a motion vector field using a second parameter set.

A9. The method of any preceding clause, further comprising determining at least one of the first parameter set or the second parameter set by:
iteratively applying candidate parameter sets to reference image frames that include a known dynamic object;
evaluating the ability of the applied candidate parameter sets to detect the known dynamic object; and
selecting one of the candidate parameter sets as the first parameter set or the second parameter set based on the evaluation of the ability of the applied candidate parameter sets to detect the known dynamic object.

A10. The method of any preceding clause, wherein identifying the detection proposal using the determined motion vector field comprises cropping at least one of the at least two image frames around a region of interest.

A11. The method of any preceding clause, wherein the at least two image frames comprise consecutive image frames.

Clause Set B:

B1. A system for detecting a dynamic object in a visual line of sight of an aircraft, the system comprising:
one or more processors; and
a memory storing instructions that, when executed by the one or more processors, cause the one or more processors to perform operations comprising:
receiving at least two image frames;
detecting a horizon within at least one of the at least two image frames;
segmenting each of the at least two image frames into at least first and second search regions using the detected horizon, wherein the first search region is defined above the detected horizon in the at least two image frames and the second search region is defined below the horizon in the at least two image frames;
determining, across the at least two image frames, a motion vector field within at least one of the first search region or the second search region; and
identifying a detection proposal using the determined motion vector field.

B2. The system of any preceding clause, wherein the operations further comprise considering the detection proposal to be a detected dynamic object.

B3. The system of any preceding clause, wherein the operations further comprise inputting the detection proposal into a neural network to detect and classify the dynamic object using the neural network.

B4. The system of any preceding clause, wherein the operations further comprise applying machine learning to detect and classify the dynamic object.

B5. The system of any preceding clause, wherein the operations further comprise applying a deterministic algorithm to determine whether the detection proposal includes a detected dynamic object.

B6. The system of any preceding clause, wherein detecting the horizon within at least one of the at least two image frames comprises:
down-sampling the at least one image frame;
converting the at least one image frame to grayscale;
blurring the at least one image frame;
filtering the at least one image frame to pull out edges of the at least one image frame;
segmenting the at least one image frame into a plurality of parts; and
detecting the horizon in the parts.

B7. The system of any preceding clause, wherein determining, across the at least two image frames, the motion vector field within at least one of the first search region or the second search region comprises determining the motion vector field using an optical flow algorithm.

B8. The system of any preceding clause, wherein determining, across the at least two image frames, the motion vector field within at least one of the first search region or the second search region comprises:
determining whether the first search region includes a motion vector field using a first parameter set; and
determining whether the second search region includes a motion vector field using a second parameter set.

B9. The system of any preceding clause, wherein the operations further comprise determining at least one of the first parameter set or the second parameter set by:
iteratively applying candidate parameter sets to reference image frames that include a known dynamic object;
evaluating the ability of the applied candidate parameter sets to detect the known dynamic object; and
selecting one of the candidate parameter sets as the first parameter set or the second parameter set based on the evaluation of the ability of the applied candidate parameter sets to detect the known dynamic object.

B10. The system of any preceding clause, wherein identifying the detection proposal using the determined motion vector field comprises cropping at least one of the at least two image frames around a region of interest.

B11. The system of any preceding clause, wherein the at least two image frames comprise consecutive image frames.

Clause Set C:

C1. A computer program product, comprising a computer usable medium having a computer readable program code embodied therein, the computer readable program code adapted to be executed to implement a method for detecting a dynamic object in a visual line of sight of an aircraft, the method comprising:
receiving at least two image frames;
detecting a horizon within at least one of the at least two image frames;
segmenting each of the at least two image frames into at least first and second search regions using the detected horizon, wherein the first search region is defined above the detected horizon in the at least two image frames and the second search region is defined below the horizon in the at least two image frames;
determining, across the at least two image frames, a motion vector field within at least one of the first search region or the second search region; and
identifying a detection proposal using the determined motion vector field.

C2. The computer program product of any preceding clause, wherein the method further comprises considering the detection proposal to be a detected dynamic object.

C3. The computer program product of any preceding clause, wherein the method further comprises detecting the dynamic object using the detection proposal, and wherein detecting the dynamic object using the detection proposal comprises at least one of:
inputting the detection proposal into a neural network to detect and classify the dynamic object using the neural network;
applying machine learning to detect and classify the dynamic object; or
applying a deterministic algorithm to determine whether the detection proposal includes a detected dynamic object.

C4. The computer program product of any preceding clause, wherein detecting the horizon within at least one of the at least two image frames comprises:
down-sampling the at least one image frame;
converting the at least one image frame to grayscale;
blurring the at least one image frame;
filtering the at least one image frame to pull out edges of the at least one image frame;
segmenting the at least one image frame into a plurality of parts; and
detecting the horizon in the parts.

C5. The computer program product of any preceding clause, wherein determining, across the at least two image frames, the motion vector field within at least one of the first search region or the second search region comprises determining the motion vector field using an optical flow algorithm.

C6. The computer program product of any preceding clause, wherein determining, across the at least two image frames, the motion vector field within at least one of the first search region or the second search region comprises:
determining whether the first search region includes a motion vector field using a first parameter set; and
determining whether the second search region includes a motion vector field using a second parameter set.

C7. The computer program product of any preceding clause, wherein the method further comprises determining at least one of the first parameter set or the second parameter set by:
iteratively applying candidate parameter sets to reference image frames that include a known dynamic object;
evaluating the ability of the applied candidate parameter sets to detect the known dynamic object; and
selecting one of the candidate parameter sets as the first parameter set or the second parameter set based on the evaluation of the ability of the applied candidate parameter sets to detect the known dynamic object.

C8. The computer program product of any preceding clause, wherein identifying the detection proposal using the determined motion vector field comprises cropping at least one of the at least two image frames around a region of interest.

C9. The computer program product of any preceding clause, wherein the at least two image frames comprise consecutive image frames.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one implementation or can relate to several implementations. The implementations are not limited to those that solve any or all of the stated problems or those that have any or all of the stated benefits and advantages. It will further be understood that reference to 'an' item refers to one or more of those items.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation (e.g., different steps, etc.) is within the scope of aspects and implementations of the disclosure.

The term "comprising" is used in this specification to mean including the feature(s) or act(s) followed thereafter, without excluding the presence of one or more additional features or acts. The terms "comprising," "including," and "having" are intended to be inclusive and mean that there can be additional elements other than the listed elements. In other words, the use of "including," "comprising," "having," "containing," "involving," and variations thereof, is meant to encompass the items listed thereafter and additional items. Further, references to "one implementation" are not intended to be interpreted as excluding the existence of additional implementations that also incorporate the recited features. The term "exemplary" is intended to mean "an example of".

When introducing elements of aspects of the disclosure or the examples thereof, the articles "a," "an," "the," and "said" are intended to mean that there are one or more of the elements. In other words, the indefinite articles "a", "an", "the", and "said" as used in the specification and in the claims, unless clearly indicated to the contrary, should be understood to mean "at least one."

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described implementations (and/or aspects thereof) can be used in combination with each other. In addition, many modifications can be made to adapt a particular situation or material to the teachings of the various implementations of the disclosure without departing from their scope. While the dimensions and types of materials described herein are intended to define the parameters of the various implementations of the disclosure, the implementations are by no means limiting and are example implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A computer-implemented method for detecting a dynamic object in a visual line of sight of an aircraft, the method comprising implementing, by a computer system, the following operations:
    receiving at least two image frames;
    detecting a horizon within at least one of the at least two image frames;
    segmenting each of the at least two image frames into at least first and second search regions using the detected horizon, wherein the first search region is defined above the detected horizon in the at least two image frames and the second search region is defined below the horizon in the at least two image frames;
    determining, across the at least two image frames, a motion vector field within at least one of the first search region or the second search region; and
    identifying a detection proposal using the determined motion vector field;
    wherein determining, across the at least two image frames, the motion vector field within at least one of the first search region or the second search region comprises:
        determining whether the first search region includes a first motion vector field using a first parameter set; and
        determining whether the second search region includes a second motion vector field using a second parameter set.

2. The method of claim 1, further comprising considering the detection proposal to be a detected dynamic object.

3. The method of claim 1, further comprising inputting the detection proposal into a neural network to detect and classify the dynamic object using the neural network.

4. The method of claim 1, further comprising applying machine learning to detect and classify the dynamic object.

5. The method of claim 1, further comprising applying a deterministic algorithm to determine whether the detection proposal includes a detected dynamic object.

6. The method of claim 1, wherein detecting the horizon within at least one of the at least two image frames comprises:
    down-sampling the at least one image frame;
    converting the at least one image frame to grayscale;
    blurring the at least one image frame;
    filtering the at least one image frame to pull out edges of the at least one image frame;
    segmenting the at least one image frame into a plurality of parts; and
    detecting the horizon in the parts.

7. The method of claim 1, wherein determining, across the at least two image frames, the motion vector field within at least one of the first search region or the second search region comprises determining the motion vector field using an optical flow algorithm.

8. The method of claim 1, further comprising determining at least one of the first parameter set or the second parameter set by:
    iteratively applying candidate parameter sets to reference image frames that include a known dynamic object;
    evaluating the ability of the applied candidate parameter sets to detect the known dynamic object; and
    selecting one of the candidate parameter sets as the first parameter set or the second parameter set based on the evaluation of the ability of the applied candidate parameter sets to detect the known dynamic object.

9. The method of claim 1, wherein identifying the detection proposal using the determined motion vector field comprises cropping at least one of the at least two image frames around a region of interest.

10. The method of claim 1, wherein the at least two image frames comprise consecutive image frames.

11. A system for detecting a dynamic object in a visual line of sight of an aircraft, the system comprising:
    one or more processors; and
    a memory storing instructions that, when executed by the one or more processors, cause the one or more processors to perform operations comprising:
        receiving at least two image frames;
        detecting a horizon within at least one of the at least two image frames;
        segmenting each of the at least two image frames into at least first and second search regions using the detected horizon, wherein the first search region is defined above the detected horizon in the at least two image frames and the second search region is defined below the horizon in the at least two image frames;
        determining, across the at least two image frames, a motion vector field within at least one of the first search region or the second search region; and
        identifying a detection proposal using the determined motion vector field;
        wherein determining, across the at least two image frames, the motion vector field within at least one of the first search region or the second search region comprises:

determining whether the first search region includes a first motion vector field using a first parameter set; and determining whether the second search region includes a second motion vector field using a second parameter set.

12. The system of claim 11, wherein the operations further comprise considering the detection proposal to be a detected dynamic object.

13. The system of claim 11, wherein the operations further comprise inputting the detection proposal into a neural network to detect and classify the dynamic object using the neural network.

14. The system of claim 11, wherein the operations further comprise applying machine learning to detect and classify the dynamic object.

15. The system of claim 11, wherein the operations further comprise applying a deterministic algorithm to determine whether the detection proposal includes a detected dynamic object.

16. The system of claim 11, wherein detecting the horizon within at least one of the at least two image frames comprises:
   down-sampling the at least one image frame;
   converting the at least one image frame to grayscale;
   blurring the at least one image frame;
   filtering the at least one image frame to pull out edges of the at least one image frame;
   segmenting the at least one image frame into a plurality of parts; and
   detecting the horizon in the parts.

17. The system of claim 11, wherein determining, across the at least two image frames, the motion vector field within at least one of the first search region or the second search region comprises determining the motion vector field using an optical flow algorithm.

18. The system of claim 11, wherein the operations further comprise determining at least one of the first parameter set or the second parameter set by:
   iteratively applying candidate parameter sets to reference image frames that include a known dynamic object;
   evaluating the ability of the applied candidate parameter sets to detect the known dynamic object; and
   selecting one of the candidate parameter sets as the first parameter set or the second parameter set based on the evaluation of the ability of the applied candidate parameter sets to detect the known dynamic object.

19. The system of claim 11, wherein identifying the detection proposal using the determined motion vector field comprises cropping at least one of the at least two image frames around a region of interest.

20. The system of claim 11, wherein the at least two image frames comprise consecutive image frames.

21. A computer program product, comprising a non-transitory computer usable medium having a computer readable program code embodied therein, the computer readable program code adapted to be executed to implement a method for detecting a dynamic object in a visual line of sight of an aircraft, the method comprising:
   receiving at least two image frames;
   detecting a horizon within at least one of the at least two image frames;
   segmenting each of the at least two image frames into at least first and second search regions using the detected horizon, wherein the first search region is defined above the detected horizon in the at least two image frames and the second search region is defined below the horizon in the at least two image frames;
   determining, across the at least two image frames, a motion vector field within at least one of the first search region or the second search region; and
   identifying a detection proposal using the determined motion vector field;
   wherein determining, across the at least two image frames, the motion vector field within at least one of the first search region or the second search region comprises:
      determining whether the first search region includes a first motion vector field using a first parameter set; and
      determining whether the second search region includes a second motion vector field using a second parameter set.

22. The computer program product of claim 21, wherein the method further comprises considering the detection proposal to be a detected dynamic object.

23. The computer program product of claim 21, wherein the method further comprises detecting the dynamic object using the detection proposal, and wherein detecting the dynamic object using the detection proposal comprises at least one of:
   inputting the detection proposal into a neural network to detect and classify the dynamic object using the neural network;
   applying machine learning to detect and classify the dynamic object; or
   applying a deterministic algorithm to determine whether the detection proposal includes a detected dynamic object.

24. The computer program product of claim 21, wherein detecting the horizon within at least one of the at least two image frames comprises:
   down-sampling the at least one image frame;
   converting the at least one image frame to grayscale;
   blurring the at least one image frame;
   filtering the at least one image frame to pull out edges of the at least one image frame;
   segmenting the at least one image frame into a plurality of parts; and
   detecting the horizon in the parts.

25. The computer program product of claim 21, wherein determining, across the at least two image frames, the motion vector field within at least one of the first search region or the second search region comprises determining the motion vector field using an optical flow algorithm.

26. The computer program product of claim 21, wherein the method further comprises determining at least one of the first parameter set or the second parameter set by:
   iteratively applying candidate parameter sets to reference image frames that include a known dynamic object;
   evaluating the ability of the applied candidate parameter sets to detect the known dynamic object; and
   selecting one of the candidate parameter sets as the first parameter set or the second parameter set based on the evaluation of the ability of the applied candidate parameter sets to detect the known dynamic object.

27. The computer program product of claim 21, wherein identifying the detection proposal using the determined motion vector field comprises cropping at least one of the at least two image frames around a region of interest.

28. The computer program product of claim 21, wherein the at least two image frames comprise consecutive image frames.

29. A computer-implemented method for detecting a dynamic object in a visual line of sight of an aircraft, the method comprising implementing, by a computer system, the following operations:

receiving at least two image frames;

detecting a horizon within at least one of the at least two image frames;

segmenting each of the at least two image frames into at least first and second search regions using the detected horizon, wherein the first search region is defined above the detected horizon in the at least two image frames and the second search region is defined below the horizon in the at least two image frames;

determining, across the at least two image frames, a motion vector field within at least one of the first search region or the second search region; and identifying a detection proposal using the determined motion vector field;

wherein detecting the horizon within at least one of the at least two image frames comprises:

down-sampling the at least one image frame;

converting the at least one image frame to grayscale;

blurring the at least one image frame;

filtering the at least one image frame to pull out edges of the at least one image frame;

segmenting the at least one image frame into a plurality of parts; and detecting the horizon in the parts.

30. The method of claim 29, further comprising considering the detection proposal to be a detected dynamic object.

31. The method of claim 29, further comprising inputting the detection proposal into a neural network to detect and classify the dynamic object using the neural network.

32. The method of claim 29, further comprising applying machine learning to detect and classify the dynamic object.

33. The method of claim 29, further comprising applying a deterministic algorithm to determine whether the detection proposal includes a detected dynamic object.

34. The method of claim 29, wherein determining, across the at least two image frames, the motion vector field within at least one of the first search region or the second search region comprises determining the motion vector field using an optical flow algorithm.

35. The method of claim 29, wherein determining, across the at least two image frames, the motion vector field within at least one of the first search region or the second search region comprises:

determining whether the first search region includes a first motion vector field using a first parameter set; and determining whether the second search region includes a second motion vector field using a second parameter set; and wherein the method further comprises determining at least one of the first parameter set or the second parameter set by:

iteratively applying candidate parameter sets to reference image frames that include a known dynamic object;

evaluating the ability of the applied candidate parameter sets to detect the known dynamic object; and selecting one of the candidate parameter sets as the first parameter set or the second parameter set based on the evaluation of the ability of the applied candidate parameter sets to detect the known dynamic object.

36. The method of claim 29, wherein identifying the detection proposal using the determined motion vector field comprises cropping at least one of the at least two image frames around a region of interest.

37. The method of claim 29, wherein the at least two image frames comprise consecutive image frames.

38. A system for detecting a dynamic object in a visual line of sight of an aircraft, the system comprising:

one or more processors; and a memory storing instructions that, when executed by the one or more processors, cause the one or more processors to perform operations comprising:

receiving at least two image frames;

detecting a horizon within at least one of the at least two image frames;

segmenting each of the at least two image frames into at least first and second search regions using the detected horizon, wherein the first search region is defined above the detected horizon in the at least two image frames and the second search region is defined below the horizon in the at least two image frames;

determining, across the at least two image frames, a motion vector field within at least one of the first search region or the second search region; and identifying a detection proposal using the determined motion vector field;

wherein detecting the horizon within at least one of the at least two image frames comprises:

down-sampling the at least one image frame;

converting the at least one image frame to grayscale;

blurring the at least one image frame;

filtering the at least one image frame to pull out edges of the at least one image frame;

segmenting the at least one image frame into a plurality of parts; and detecting the horizon in the parts.

39. The system of claim 38, wherein the operations further comprise considering the detection proposal to be a detected dynamic object.

40. The system of claim 38, wherein the operations further comprise inputting the detection proposal into a neural network to detect and classify the dynamic object using the neural network.

41. The system of claim 38, wherein the operations further comprise applying machine learning to detect and classify the dynamic object.

42. The system of claim 38, wherein the operations further comprise applying a deterministic algorithm to determine whether the detection proposal includes a detected dynamic object.

43. The system of claim 38, wherein determining, across the at least two image frames, the motion vector field within at least one of the first search region or the second search region comprises determining the motion vector field using an optical flow algorithm.

44. The system of claim 38, wherein determining, across the at least two image frames, the motion vector field within at least one of the first search region or the second search region comprises:

determining whether the first search region includes a first motion vector field using a first parameter set; and determining whether the second search region includes a second motion vector field using a second parameter set; and wherein the operations further comprise determining at least one of the first parameter set or the second parameter set by:

iteratively applying candidate parameter sets to reference image frames that include a known dynamic object;

evaluating the ability of the applied candidate parameter sets to detect the known dynamic object; and selecting one of the candidate parameter sets as the first parameter set or the second parameter set based on the evaluation of the ability of the applied candidate parameter sets to detect the known dynamic object.

45. The system of claim 38, wherein identifying the detection proposal using the determined motion vector field comprises cropping at least one of the at least two image frames around a region of interest.

46. The system of claim 38, wherein the at least two image frames comprise consecutive image frames.

47. A computer program product, comprising a non-transitory computer usable medium having a computer readable program code embodied therein, the computer readable program code adapted to be executed to implement a method for detecting a dynamic object in a visual line of sight of an aircraft, the method comprising:

receiving at least two image frames;

detecting a horizon within at least one of the at least two image frames;

segmenting each of the at least two image frames into at least first and second search regions using the detected horizon, wherein the first search region is defined above the detected horizon in the at least two image frames and the second search region is defined below the horizon in the at least two image frames;

determining, across the at least two image frames, a motion vector field within at least one of the first search region or the second search region; and identifying a detection proposal using the determined motion vector field;

wherein detecting the horizon within at least one of the at least two image frames comprises:

down-sampling the at least one image frame;

converting the at least one image frame to grayscale;

blurring the at least one image frame;

filtering the at least one image frame to pull out edges of the at least one image frame;

segmenting the at least one image frame into a plurality of parts; and detecting the horizon in the parts.

48. The computer program product of claim 47, wherein the method further comprises considering the detection proposal to be a detected dynamic object.

49. The computer program product of claim 47, wherein the method further comprises detecting the dynamic object using the detection proposal, and wherein detecting the dynamic object using the detection proposal comprises at least one of:

inputting the detection proposal into a neural network to detect and classify the dynamic object using the neural network;

applying machine learning to detect and classify the dynamic object; or applying a deterministic algorithm to determine whether the detection proposal includes a detected dynamic object.

50. The computer program product of claim 47, wherein determining, across the at least two image frames, the motion vector field within at least one of the first search region or the second search region comprises determining the motion vector field using an optical flow algorithm.

51. The computer program product of claim 47, wherein determining, across the at least two image frames, the motion vector field within at least one of the first search region or the second search region comprises:

determining whether the first search region includes a first motion vector field using a first parameter set; and determining whether the second search region includes a second motion vector field using a second parameter set; and wherein the method further comprises determining at least one of the first parameter set or the second parameter set by:

iteratively applying candidate parameter sets to reference image frames that include a known dynamic object;

evaluating the ability of the applied candidate parameter sets to detect the known dynamic object; and selecting one of the candidate parameter sets as the first parameter set or the second parameter set based on the evaluation of the ability of the applied candidate parameter sets to detect the known dynamic object.

52. The computer program product of claim 47, wherein identifying the detection proposal using the determined motion vector field comprises cropping at least one of the at least two image frames around a region of interest.

53. The computer program product of claim 47, wherein the at least two image frames comprise consecutive image frames.

* * * * *